United States Patent
Sekiya

[19]
[11] Patent Number: 5,963,437
[45] Date of Patent: Oct. 5, 1999

[54] POWER CIRCUIT

[75] Inventor: Toshiyuki Sekiya, Mishima, Japan

[73] Assignee: Canon Kabushiki Kaisha, Tokyo, Japan

[21] Appl. No.: 08/927,401

[22] Filed: Sep. 10, 1997

[30] Foreign Application Priority Data

Sep. 11, 1996 [JP] Japan ................................. 8-261208

[51] Int. Cl.⁶ .......................................... H02M 3/335
[52] U.S. Cl. .......................... 363/21; 363/97; 363/131
[58] Field of Search .............................. 363/17, 20, 21, 363/19, 56, 89, 95, 97, 98, 131, 132

[56] References Cited

U.S. PATENT DOCUMENTS

| | | | |
|---|---|---|---|
| 5,297,104 | 3/1994 | Saito et al. | 363/21 |
| 5,532,913 | 7/1996 | Suzuki et al. | 363/25 |
| 5,598,324 | 1/1997 | Imamura et al. | 363/21 |
| 5,619,403 | 4/1997 | Ishikawa et al. | 363/21 |
| 5,719,755 | 2/1998 | Usui | 363/19 |

*Primary Examiner*—Adolf Deneke Berhane
*Attorney, Agent, or Firm*—Fitzpatrick Cella Harper & Scinto

[57] ABSTRACT

A power circuit includes a transformer having a flyback winding for outputting an energy at an off-time of a primary winding to a secondary circuit a forward winding for outputting an energy at an on-time of the prime winding and a high voltage winding for outputting an energy over an entire period, a first rectifying circuit for rectifying the output of the flyback winding; a second rectifying circuit for rectifying the output of the forward winding, a voltage detection means for detecting the output voltage of the first rectifying circuit, first control means for controlling the on-time of the transformer in accordance with the output of the voltage detection means to control the output voltage of the first rectifying circuit to a predetermined value, and second control means for turning on and off the output voltage of the second rectifying circuit independently from the first control means.

12 Claims, 23 Drawing Sheets

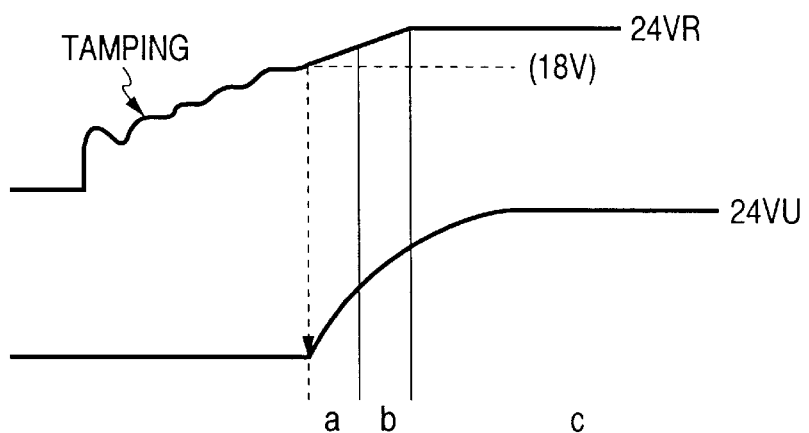
FIG. 2A
FIG. 2B
FIG. 5A
FIG. 5B
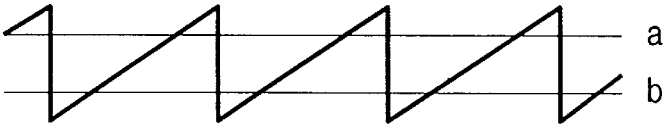
FIG. 5C
FIG. 5D

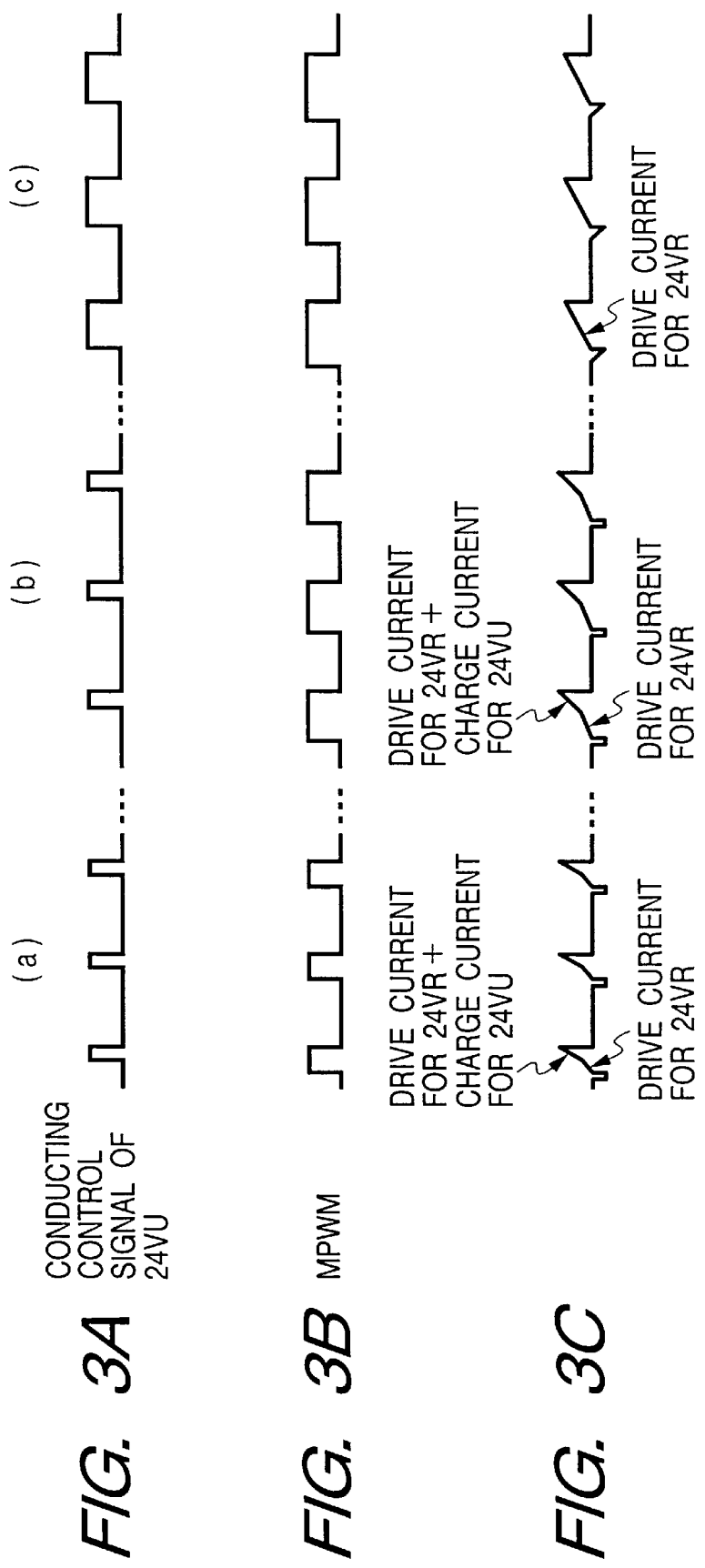

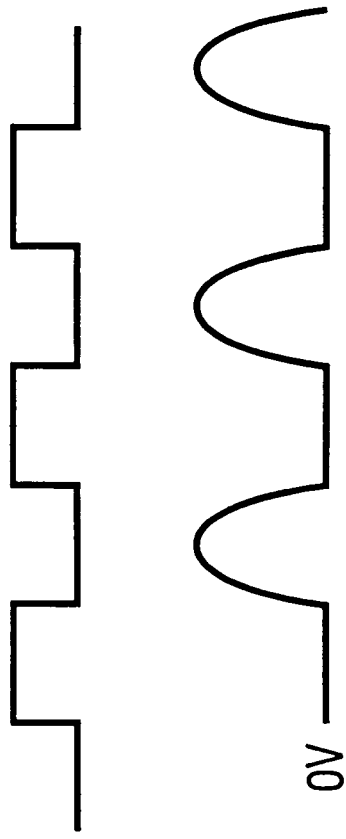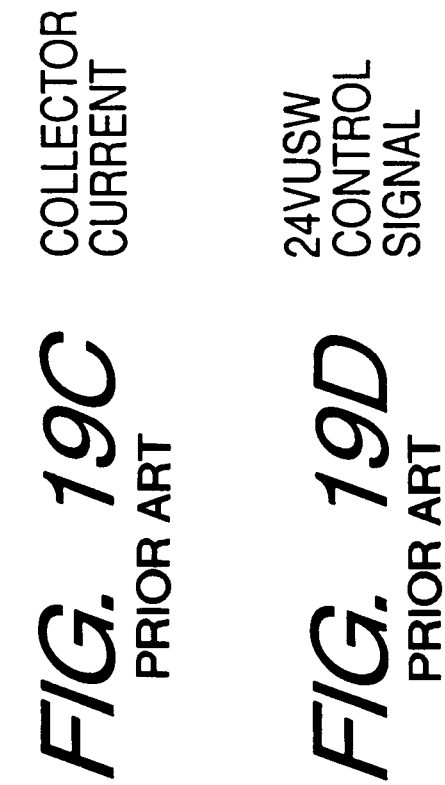
FIG. 19A PRIOR ART  MPWM
FIG. 19B PRIOR ART  COLLECTOR VOLTAGE
FIG. 19C PRIOR ART  COLLECTOR CURRENT
FIG. 19D PRIOR ART  24VUSW CONTROL SIGNAL

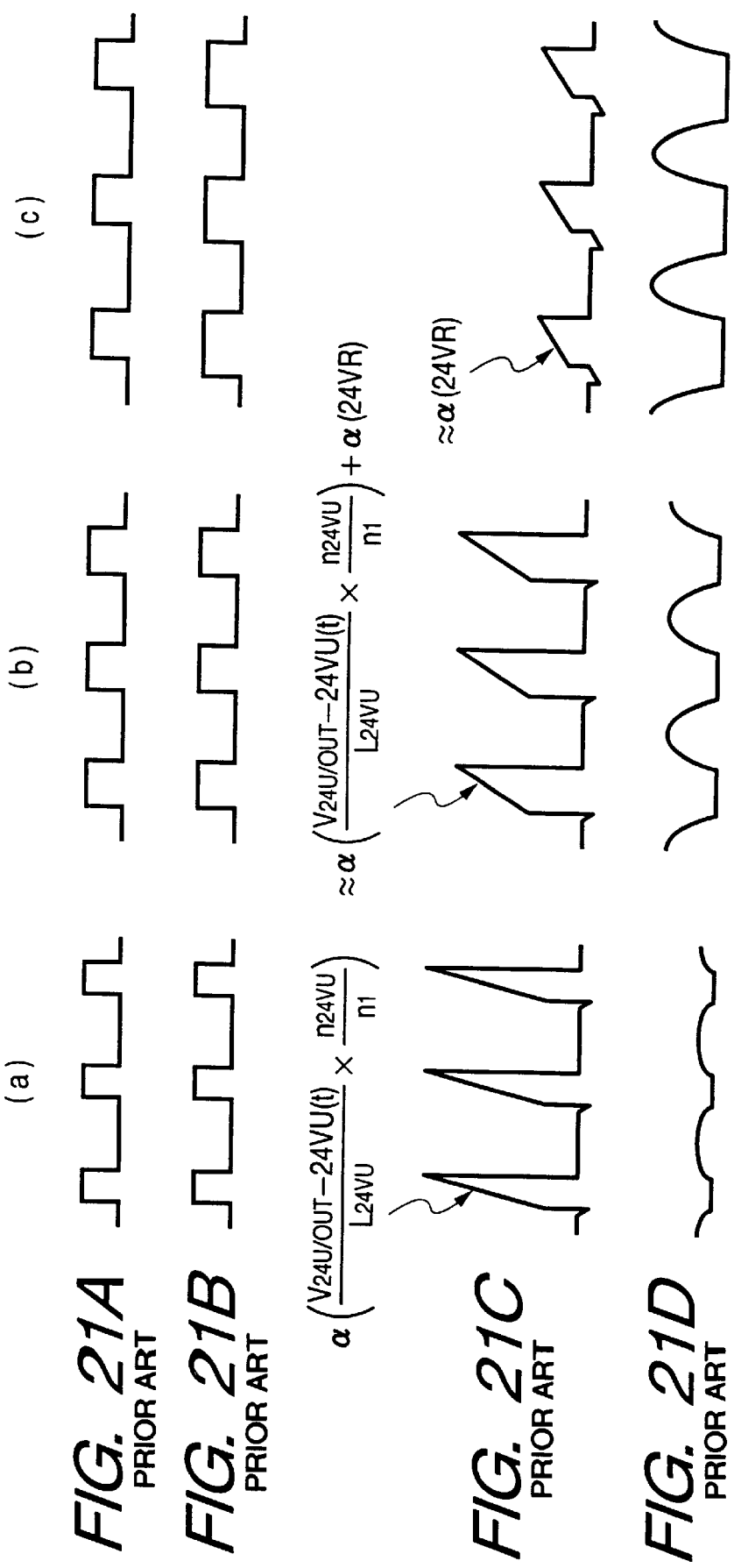

POWER CIRCUIT

BACKGROUND OF THE INVENTION

1. Field of the Invention

The present invention relates to a power circuit including a high voltage transformer.

2. Related Background Art

In the prior art, as a power system for an electrophotographic image forming system such as a copying machine, a system which activate a low voltage output for operating a system logic circuit, a motor or a solenoid and a high voltage output for a charger has been proposed and put into practice.

As an example of a prior art power system of this type, a block configuration of a hybrid power circuit mounted on a copying machine is shown in FIG. 18. In FIG. 18, numeral 1 denotes a commercial AC power line, numeral 2 denotes a rectifying bridge, numeral 3 denotes a first filtering capacitor, numeral 4 denotes an input winding drive switching element, numeral 5 denotes a resonance capacitor which functions to generate a voltage resonance in cooperation with an inductance component of a hybrid transformer 20 to be described later, numeral 6 denotes a clamping diode, numeral 7 denotes a current transformer for monitoring currents flowing in the input winding drive switching element 4, the resonance capacitor 5 and the clamping diode 6, and numeral 8 denotes a drive transformer for temporarily transmitting a switching element drive signal from a main control unit 9 in a secondary circuit. The main control unit 9 controls an on-operation time of a primary winding 21 in accordance with a detection result of a rectified output voltage of a low voltage flyback winding 22. The main control unit 9 comprises a drive signal output circuit 9a for the switching element 4, primary circuit drive current detection signal input circuit 9b and a 24 VR filtered voltage detection signal input circuit 9c.

Further, in FIG. 18, numeral 10 denotes a diode for rectifying an output of the low voltage flyback winding 22 and numeral 11 denotes a filtering capacitor. The output of the winding 22 in the present example is controlled to 24 volts and it is referred to as 24 VR. Numeral 112 denotes a voltage detection resistor for detecting the 24 VR voltage, numeral 13 denotes a diode for rectifying an output of a low voltage forward winding 23, and numeral 14 denotes a switching element which turns on and off such that the filtered output of the low voltage forward winding 23 is maintained at a predetermined voltage. The output of the winding 23 in the present example is controlled to 24 volts and it is referred to as 24 VU. Numeral 15 denotes a flywheel diode, numeral 16 denotes a rectifying inductance, numeral 17 denotes a filtering capacitor, numeral 18 denotes an output detection resistor for detecting the 24 VU output, numeral 19 denotes a sub-control unit which controls a conduction angle of the switching element 14 such that the 24 VU output is maintained at a predetermined voltage. The sub-control unit comprises a drive signal output circuit 19a for the VU switching element 14, a 24 VU filtered output detection signal input circuit 19b and a drive signal input circuit 19c for the switching element 4.

Further, in FIG. 18, numeral 20 denotes a hybrid transformer which comprises a primary winding 21, a low voltage flyback winding 22, a low voltage forward winding 23 and high voltage winding 24 and 25. Numeral 26 denotes a diode for rectifying the output of the high voltage winding 24 to a negative voltage, numeral 27 denotes a filtering capacitor, numeral 28 denotes a diode for rectifying the output of the high voltage winding 25 to a positive voltage and numeral 29 denotes a filtering capacitor.

An operation of the power circuit of the above configuration is now explained.

A current from the commercial AC power line 1 is rectified and filtered by the rectifying bridge 2 and the filtering capacitor 3 and applied to one end of the primary winding 21 of the hybrid transformer 20. During the on-time of the switching element 4, a current flowing in the switching element 4 linearly increases with a gradient which is inversely proportional to an input inductance of the hybrid transformer 20. During the on-time of the switching element 14 for the 24 VU winding output, a winding current thereof is superimposed on the primary circuit switching element 4 inversely proportionally to a turn ratio.

When the primary circuit switching element 4 is turned off, an LC resonance by the primary circuit inductance and the resonance capacitor 5 is generated in accordance with a current energy of that time. A voltage of the resonance capacitor 5 is substantially sinusoidal wave. A negative side is limited to a diode forward voltage by the clamping diode 6. The main control unit 9 monitors the status by the current transformer 7 and when it detects the flow-in of the current into the negative side, it generates the on-signal again to the switching element 4. The low voltage flyback winding 22 of the hybrid transformer 20 is rectified and filtered at a phase of a resonance peak and this voltage is monitored by the main control unit 9. When the output of the winding 22 is lower than 24 volts, the primary control circuit 9 in the secondary circuit increase the on-period of the switching element 4, and when it is higher, it decreases the on-period.

In this manner, the switching at 0 volt is always attained for the switching element 4 and the rectified voltage of the low voltage flyback winding 22 is controlled to 24 volts. On the other hand, other output windings output the output voltage in accordance with a turn ratio of the hybrid transformer 20.

In this manner, the LC flyback voltage resonance is generated in the input circuit of the hybrid transformer 20 and the peak current value of the output of the low voltage flyback winding 22 is controlled to the predetermined voltage in the output circuit so that the flyback circuit high voltage outputs having the peak value thereof controlled to the constant voltage are generated in the high voltage output windings 24 and 25 of the hybrid transformer 20.

In general, the main control unit 9 is added with a so-called soft start function to gradually raise in time a 24 VR control target voltage so that a predetermined time is spent for the rise to a 24 VR final target in order to reduce transient current and burdens of related components.

The 24 VU winding output is poled to rectify the so-called forward circuit output and in general, it may be larger than the output voltage of the 24 VR, but since the forward circuit voltages of the respective winding of the hybrid transformer 20 are substantially proportional to the filtered voltage of the AC input voltage, individual voltage controls may be required in the secondary circuit depending on the precision required to the output voltages. The 24 VU voltage control unit (sub-control unit) 19 monitors the 24 VU current and voltage, and changes the conduction rate of the switching element 14 to control the output voltage to the predetermined voltage.

Main operation waveforms in a steady state is shown in FIGS. 19A to 19D. FIGS. 19A to 19D show steady state operations when a 24 VU external load is in an on-state.

FIG. 19A shows an operation waveform of an MPWM, FIG. 19B shows an operation waveform of a collector voltage of the switching element 4, FIG. 19C shows an operation waveform of a collector current of the switching element 4 and FIG. 19D shows an operation waveform of the 24 VUSW (switching element 14).

In an electrostatic electrophotographic image forming system of the prior art, several types of high voltage circuits which output several hundreds voltages to several tens kilovolts are provided for the purpose of the charging to a photo-conductor, the development, the transfer to a transfer sheet and the separation of the transfer sheet from the photo-conductor.

A predetermined on/off signal, an output control signal and an output current control signals are received in accordance with the purpose to control the output. Recently, as a finer optimization trend of an image forming condition, a demand to switch the output voltage by an electrical impedance of the high voltage output load of the charging unit or the transfer unit to a more optimum value has been arisen. Namely, it intends to positively respond to a change of the electrical impedance by the change of environment and aging.

In order to achieve the above object, a high voltage power circuit which outputs a high voltage at a predetermined constant current value when an image forming operation is not conducted, detects the output voltage at that time and calculates a load resistance, and determines the output voltage value or the output current value in accordance with the result thereof has been put into practice.

FIG. 23 shows a block configuration of a prior art high voltage power circuit of this type. In FIG. 23, numeral 30 denotes a high voltage transformer which, in the present example, comprises an output winding 31, an input winding 32, a detection winding 33, a high voltage use rectifying diode 34 and a bleeder resistor 35 connected to the output winding 31, numeral 36 denotes a follower transistor for transmitting a voltage to an input circuit of the high voltage transformer 30 in accordance with a result of comparison by the control circuit, numeral 37 a filtering capacitor for supplying a stable DC voltage to the input winding of the high voltage transformer 30, numeral 38 denotes an oscillator for generating a high frequency signal to drive the high voltage transformer 30, numeral 39 denotes a switching transistor, numeral 40 denotes a resonance capacitor for generating an LC flyback resonance with an input inductance of the high voltage transformer 20 and numeral 41 denotes a clamping diode for clamping the intrusion of the resonance waveform into a negative side.

Further, in FIG. 23, numeral 42 denotes an output (series) resistor for detecting a current to the load which is selected to a high resistance in the order of several M Ω to several tens M Ω, numeral 43 denotes a load current detection circuit for detecting the current to the load and comprises resistors 44 and 45 and a capacitor 46, numeral 47 denotes a buffer circuit for connecting the voltage of the load current detection circuit 43 to a succeeding stage with a high input resistance, numeral 48 denotes an operational amplifier for comparing the detected current value and a target set value, numeral 49 denotes a control target set voltage, numeral 50 denotes a filter circuit to render the output voltage of the filter circuit 50 to exhibit a desired frequency characteristic, numeral 51 denotes a diode for transmitting the output voltage of the filter circuit 50 to the input circuit of the high voltage transformer 20 and numeral 52 denotes a constant voltage control block which functions as a constant voltage control loop when a voltage larger than the output of the filter circuit 50 is outputted. The constant voltage control block 52 comprises transistors 53 and 54, a diode 55, resistors 56, 57, 58, 59, 60 and 61 and a capacitor 62.

The high voltage circuit unit 63 is configured in the above manner.

Further, in FIG. 23, numeral 63 denotes a load connected to the output of the high voltage circuit unit 63 and it assumes a parallel circuit of the resistor 65 and the capacitor 66 as an electrical characteristic, numeral 67 denotes a power controller which has a function to control the overall operation of the high voltage power circuit and the operation thereof is controlled by an external control unit which controls the overall operation of the high voltage power circuit, and numeral 68 denotes a rectifying/filtering circuit which comprises a diode 69, resistors 70, 71 and 72 and a capacitor 73.

An operation of the above high voltage circuit unit 63 is now explained.

First, the external control unit (not shown) (which is a controller for the overall high voltage power circuit which remotely controls the operation of the high voltage circuit unit 63) receives a load resistance measurement value start mode signal (not shown). In response thereto, a high voltage output enable signal is sent to the oscillator 33 in the off-state of the output voltage of the constant voltage control block 52. Thus, the oscillator 38 starts the oscillation at predetermined frequency and duty to switch the switching transistor 39. During the on-period of the switching transistor 39, a predetermined energy is stored in the high voltage transformer 30 in accordance with the input voltage, the on-time and the input impedance of the high voltage transformer 30. On the other hand, during the off-period of the switching transistor 39, the energy causes the LC resonance by the input impedance of the high voltage transformer 30 and the resonance capacitor 40 and a so-called flyback voltage is generated at the collector of the switching transistor 39. This voltage is transmitted to other windings in accordance with the turn ratio so that a higher voltage is generated in an output winding of a high turn ratio. It is supplied to the external load 53 through the rectifying diode 36. In general, a substantially peak voltage $V_o$ of the output winding is held by a component of the capacitor 66 of the external load 64 and a DC high voltage output is supplied. A external load current $I_d$ at this time is determined by a formula (1):

$$I_d = V_o/(R1+R2+R3) \tag{1}$$

where R1 is a resistance of the resistor 65, R" is a resistance of the resistor 42 and R3 is a total impedance of the load current detection circuit 43.

The value of the current detection point Vdet is dropped by the external load current. When the value of the current detection point Vdet is larger than the value of the control target set voltage 49, the output of the operational amplifier 48 rises and the input voltage of the high voltage transformer 30 rises. Thus, the output voltage of the high voltage transformer rises and the load current increases to operate to reduce the value of the current detection point Vdet. Inversely, when the value of the current detection point Vdet is lower than the control target set voltage 49, the output voltage of the operational amplifier 48 drops and the input voltage of the high voltage transformer 30 drops.

In this manner, the output of the high voltage transformer 30 is regulated such that the load current is equal to the set value. Under this condition, the output of the output voltage detection winding 33 is inputted to an A/D port of the power controller 67 through the rectifying/filtering circuit 68 to calculate the high voltage output voltage.

In this manner, the load current and voltage are determined and the load impedance is determined, and an optimum high voltage output value is determined by the calculation in accordance with the result.

Thereafter, in response to the reception of an image area high voltage output on signal (not shown) from the external control unit, the output voltage of the constant voltage output control block 52 is set such that the previously determined optimum output voltage is outputted. In the present example, since the constant current control loop is always closed by the diode 51, only the output voltage which is larger than the output voltage in the constant current output mode may be set. The output voltage is feedback controlled by serially monitoring the voltage of the detection winding 33 so that the constant voltage control is conducted.

For a high voltage output circuit which controls the load current to a predetermined value, load current detection means is provided in the power circuit and the input voltage to the transformer is controlled in accordance with the output value of the detection means so that the load current is controlled to the desired constant value.

FIG. 24 shows a block configuration of a prior art power circuit which conducts such control. In FIG. 24, numeral 74 denotes a high voltage transformer which, in the present example, comprises an output winding 75a, an input winding 75b and a high voltage use rectifying diode connected to the output winding 75a, numeral 77 denotes a filtering capacitor for supplying a DC voltage to the input winding 75b, numeral 78 denotes an oscillator (OSC) for generating a high frequency signal to drive the high voltage transformer 74, numeral 79 denotes a switching transistor, numeral 80 denotes a resonance capacitor for causing the LC flyback resonance with the input impedance of the high voltage transformer 74, numeral 81 denotes a clamping diode for limiting the intrusion of the resonance waveform into the negative side, numeral 82 denotes a resistor for detecting the current to the load which is selected as an output (series) resistor having a high resistance of several M Ω to several tens M Ω, numeral 83 denotes a load current detection circuit for detecting the current to the load, numeral 84 denotes a buffer circuit for connecting the voltage of the load current detection circuit 83 to a succeeding stage with a high input resistance, numeral 85 denotes an operational amplifier for comparing the detected current value and the control target set voltage value, numeral 86 denotes a control target set voltage, numeral 87 a filter circuit to render the output voltage of the control loop to exhibit the desired frequency characteristic and numeral 88 denotes an emitter follower transistor for transmitting the output voltage of the filter circuit 87 to the input circuit of the high voltage transformer 74.

Those components constitute the high voltage circuit unit 89.

Further, in FIG. 24, numeral 90 denotes a load connected to the output circuit of the high voltage circuit unit 89, which in the case of electrography, corresponds to a charger and assumes a parallel circuit of a resistor 91 and a capacitor 92 as an electrical characteristic, numeral 93 denotes an external control unit which has a control function to control an overall operation of the power circuit and numeral 94 denotes a signal line for transmitting a setting value of a load current from the external control unit 93 to the high voltage circuit unit 89 for setting a voltage which is a control target voltage value of the operational amplifier 85. Various transmission systems may be used although they are not specifically referred here. Numeral 95 denotes a signal line for setting the output on/off from the external control unit 93 to the high voltage circuit unit 89. In the present example, an oscillation start/stop signal is transmitted to the oscillator 78.

An operation in a constant current mode in the high voltage circuit unit 89 of the above configuration is now explained.

First, a current setting value is set from the external control unit 93 to the high voltage circuit unit 89. In the present example, the load current detection circuit 83 is constructed to exhibit a current-voltage characteristics as shown in FIG. 25. Namely, when the load current is 0, the detected voltage is 4 volts, and as the load current increases, the detected voltage linearly decreases. Accordingly, when the current setting is conducted, a value smaller than 4 volts is set as the control target voltage value of the operational amplifier 85.

Then, the output on/off signal is turned on. Thus, the oscillator 78 starts the oscillation at the predetermined frequency and duty to switch the switching transistor 79. During the on-period of the switching transistor 79, a predetermined energy is stored in the high voltage transformer 74 in accordance with the input voltage, the on-time and the input inductance of the high voltage transformer 74. On the other hand, during the off-period of the switching transistor 79, the energy causes the LC resonance by the input inductance of the high voltage transformer 74 and the resonance capacitor 80 so that a so-called flyback voltage is generated at the collector of the switching transistor 88. This voltage is transmitted to other windings in accordance with the turn ratio so that a higher voltage is generated in the output winding 75a of a large number of turns. It is supplied to the external load 90 through the rectifying diode 76. In general, a substantially peak value $V_o$ of the output winding is held by the component of the capacitor 92 of the external load 90 and a DC high voltage output is supplied to the external load 90. The external load current $I_d$ at this time is determined by:

$$I_d = V_o/(R1+R2+R3) \qquad (1)$$

where R1 is a resistance of the resistor 91, R2 is a resistance of the resistor 82 and R3 is a total impedance of the load current detection circuit 83.

The value of the current detection point Vdet is dropped by the external load current. When the value of the current detection point Vdet is larger than the control target set value 86, the output voltage of the operational amplifier 85 rises and the input voltage of the high voltage transformer 74 rises. Thus, the output voltage of the high voltage transformer 74 rises and the load current increases to reduce the value of the current detection point Vdet. Inversely, when the value of the current detection point Vdet is lower than the value of the control target set voltage 86, the output voltage of the operational amplifier 85 drops and the input voltage of the high voltage transformer 74 drops.

In this manner, the output voltage of the high voltage transformer 74 is regulated such that the load current is equal to the set value.

In the above example, the constant high voltage output current control is attained by increasing and decreasing the magnitude of the input voltage of the high voltage transformer 74. In other example, the duration of the on-time in the switching drive of the high voltage transformer 74 is increased and decreased to attain the constant high voltage output current control.

However, the circuit shown in FIG. 18 raises the following problems.

(1) Since the output current of the secondary circuit forward winding is superimposed on the drive current of the primary circuit switching element 4 inversely proportionally to the turn ratio, a very large drive current is superimposed on the primary circuit switching element 4 during the rise period in which the voltage of the 24 VU filtering capacitor is small and the charging current is large so that a burden is imposed to the related components.

(2) Since the above state occurs before the primary circuit LC voltage resonance which is the main control drive source shifts to the oscillation state by the stable 0 volt switching, the transition period to shift to the stable resonance state is extended and the burden is imposed to the related components for a longer period.

This manner is explained with reference to FIGS. 20A to 20C and FIGS. 21A to 21D.

FIGS. 20A to 20C show the outputs in the circuit of FIG. 18, that is, the 24 VR and 24 VU voltage rise waveforms. FIG. 20A shows the 24 VR voltage rise waveform, FIG. 20B shows the 24 VU voltage rise waveform and FIG. 20C shows the period.

The 24 VR is controlled to reach the final target value with the predetermined time by the soft start control function by the gentle extension of the on-time of the main control pulse (24 VU switching element control signal) 19a or the gentle rise of the control reference value by the main control unit. On the other hand, for the 24 VU, because of the nature of the source winding in the forward circuit, the output having the substantially final value is supplied from the winding even during the soft start so that the final target value is rapidly reached.

FIGS. 21A to 21D show waveforms of the 24 VU control signal in the periods a, b and c of FIG. 20C, a waveform of the main control signal (24 VR control signal), a waveform of the drive current of the primary circuit switching element 4 and a waveform of the collector voltage. FIG. 21A shows the waveform of the 24 VU control signal, FIG. 21B shows the waveform of the main control signal (24 VR control signal), FIG. 21C shows the waveform of the primary circuit switching element 4 and FIG. 21D shows the waveform of the collector voltage.

In the period a, the initial manner of the 24 VR rise is shown. The main control signal is started by the PWM signal having a narrow on-period by the soft start function. On the other hand, since the 24 VU is much lower than the target value, the 24 VU control signal is totally on during the forward circuit on-period. (It is the PWM signal substantially identical to the main control signal). At this time, the 24 VU forward circuit winding output is already at the final value as described above. The 24 VU forward circuit winding output is a turn ratio equivalent ($V_{24Uout}$) of the DC input voltage of the primary circuit, and since the charging voltage (24 VU(t)) of the secondary circuit output capacitor is low, most of it is applied to the filtering inductance ($L_{24U}$) so that a large winding output current (and a large time gradient α) are generated. The secondary circuit current becomes the drive current of the primary circuit switching element 4 in accordance with the turn ratio.

As the time transit to the periods b and c, the voltage of the 24 VU output capacitor rises, the secondary circuit winding output current naturally decreases and finally the winding output current is substantially 0 if the 24 VU external load is not on. At this time, the primary circuit current is the drive circuit for merely storing the 24 VR flyback energy. (The load current of the high voltage winding may be neglected because it is generally very small.) The gradient of the primary circuit current increase at this time is substantially determined by the primary inductance of the high voltage transformer 20 and the DC input voltage. In the period b, it is in an intermediate state.

In the period a, the primary circuit drive current may be equal to or larger than a steady state (24 VU rated external load current flows) maximum value depending on a circuit design condition. In such a case, a protection circuit configuration (not shown) to protect against an overcurrent by detecting the drive current of the primary circuit switching element 4 may not be attained or a protection level should be set to much lower than that expected from the rated load.

The above has been discussed primarily on the problem (1). The problem (2) is now discussed with reference to FIGS. 22A and 22B.

FIGS. 22A and 22B show waveforms of the drive current of the primary circuit switching element 4 and the collector voltage in the three start periods a, b and c. FIG. 22A shows the drive current waveform, FIG. 22B shows the collector voltage waveform, and a shows the period immediately after the start of the output of the main control pulse. The main control pulse starts from a state in which the DC voltage applied to the other end of the primary winding is fully charged in the resonance capacitor 5. The pulse width is controlled to start from the narrowest width (soft start) but since the switching elements 4 shorts the charging load of the resonance capacitor 5, a very large current flows during this period as shown. During this period, a sufficiently large current to cause the LC resonance naturally does not flow and the flyback waveform cannot jump back to 0 volt.

Thereafter, before the voltage resonance waveform by the perfect 0 volt switching as in the period c is attained, there is a transient period as the period b in which flyback waveform gradually grows but the flyback energy is yet low and the normal 0 volt switching is not attained. When the 24 VU charging current is superimposed during this period, the primary circuit current waveform as shown at the top of FIGS. 22A and 22B appears and the current which shorts the remaining voltage of the resonance capacitor 5 by the switching element 4 and the superimposing current from the secondary circuit are combined so that a large current load is imposed to the switching element 4.

When the main control has a control algorithm to detect the moment of switching of the primary circuit drive current from positive to negative to start the next on-operation, the intrusion of the flyback resonance waveform to 0 volt is further impeded during the transient period in which the 24 VU charging current is superimposed on the primary circuit in the positive direction and the shift to voltage resonance control state by the normal 0 volt switching is further delayed.

In the circuit shown in FIG. 23, during the period in which the output voltage is small for the constant current output I and the current for charging the capacitor component occupies a large portion of the total load current for the current flowing in accordance with the load resistance, the output current is given by $$(i \times t)/c \qquad (2)$$

and it is a waveform which linearly increases in time with a gradient proportional to the constant current value. When a parallel resistance component r is considered together, the time change for the final output is represented by {1−exp (−t/cr)} where cr is a time constant. In this case, a long time may be needed to reach the final output value depending on the resistance component and the capacitance component of the output load. For example, when the load capacitance is 200 pF and the load resistance is 500 MΩ, the time constant or is approximately 100 ms and a time longer than that is naturally required to attain the output closer to the final value.

It has been described above that the measurement of the load impedance is conducted while the image forming operation is not conducted. For example, when the load impedance is measured before the image forming operation, the load impedance measurement period is directly added to the so-called fast copy time depending on the pre-processing sequence of the copying operation and the extension of the fast copy time cannot be neglected and faster measurement method is desired.

Further, in the circuit shown in FIG. 24, when the resistance of the external load circuit becomes very high resistive by any cause, for example, when a trouble occurs in a supply circuit from the output of the high voltage power unit to the external load or a connection cable is disconnected by some cause, the load current does not flow and the constant current control loop increases the input voltage of the high voltage transformer up to the maximum capacity of the circuit unit or increases the on-time so that the output voltage largely exceeds the maximum output which is required for the normal load.

SUMMARY OF THE INVENTION

It is an object of the present invention to provide a power circuit which eliminates the above defects.

It is another object of the present invention to provide a power circuit which can lower a current rating of each component, allows economical part selection, allows setting of a set current of a primary circuit current protection circuit to a value based on a rated current operation in a normal operation without considering a transient maximum current at the start and can improve an operational stability.

It is other object of the present invention to provide a power circuit which can shorten a charging period for a capacitance component of an external load and allows rapid reach to a desired constant current value.

It is a further object of the present invention to provide a power circuit which can limit the output voltage to a predetermined value even when the external load is disconnected or becomes very highly resistive by some cause.

Other objects of the present invention, and advantages thereof, will become fully apparent from the following description of the embodiments thereof, to be taken in conjunction with the attached drawings.

BRIEF DESCRIPTION OF THE DRAWINGS

FIGS. 2A and 2B show signal output states in the power circuit in accordance with the first embodiment, FIGS. 3A, 3B and 3C show output timings of signals and drive current in the power circuit in accordance with the first embodiment, FIGS. 5A, 5B, 5C and 5D show signal waveforms in the constant voltage control circuit shown in FIG. 4, FIGS. 19A, 19B, 19C and 19D show major steady state operational waveforms in the prior art power circuit shown in FIG. 18, FIGS. 20A, 20B and 20C show voltage rise waveforms in the prior art power circuit shown in FIG. 18, FIGS. 21A, 21B, 21C and 21D show signal waveforms in periods a, b and c of FIG. 20C, FIGS. 22A and 22B show waveforms of a primary circuit switching element in the prior art power circuit shown in FIG. 18.

DETAILED DESCRIPTION OF THE PREFERRED EMBODIMENTS

The embodiments of the present invention are now explained with reference to FIGS. 1, 2A and 2B, 3A to 3C, 4, 5A to 5D, 6 to 13, 14A to 14F, 15 to 17.

First Embodiment

Figure 18:
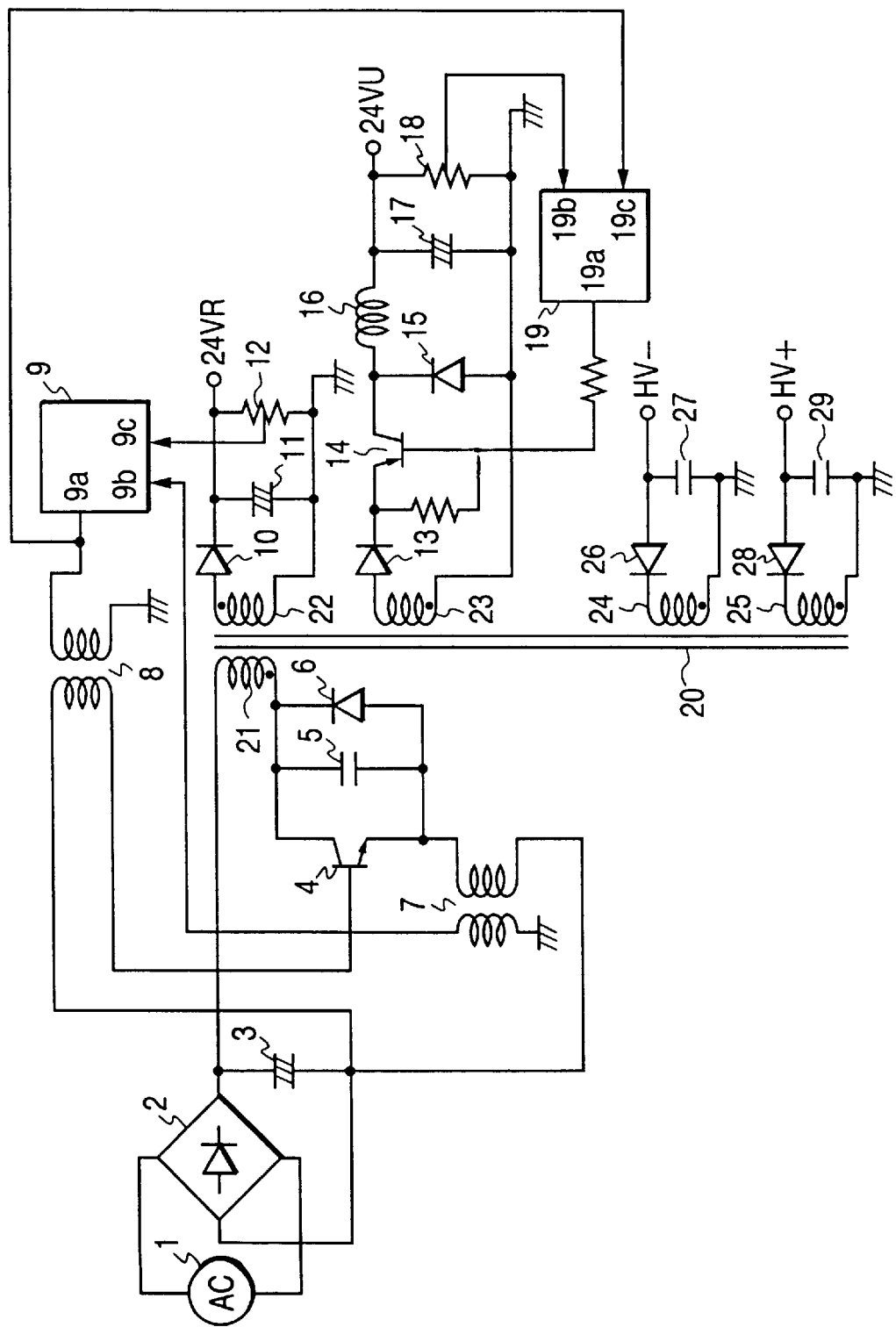
FIG. 18 shows a block diagram of a configuration of a prior art power circuit.
Figures 20A, 20B, 20C:
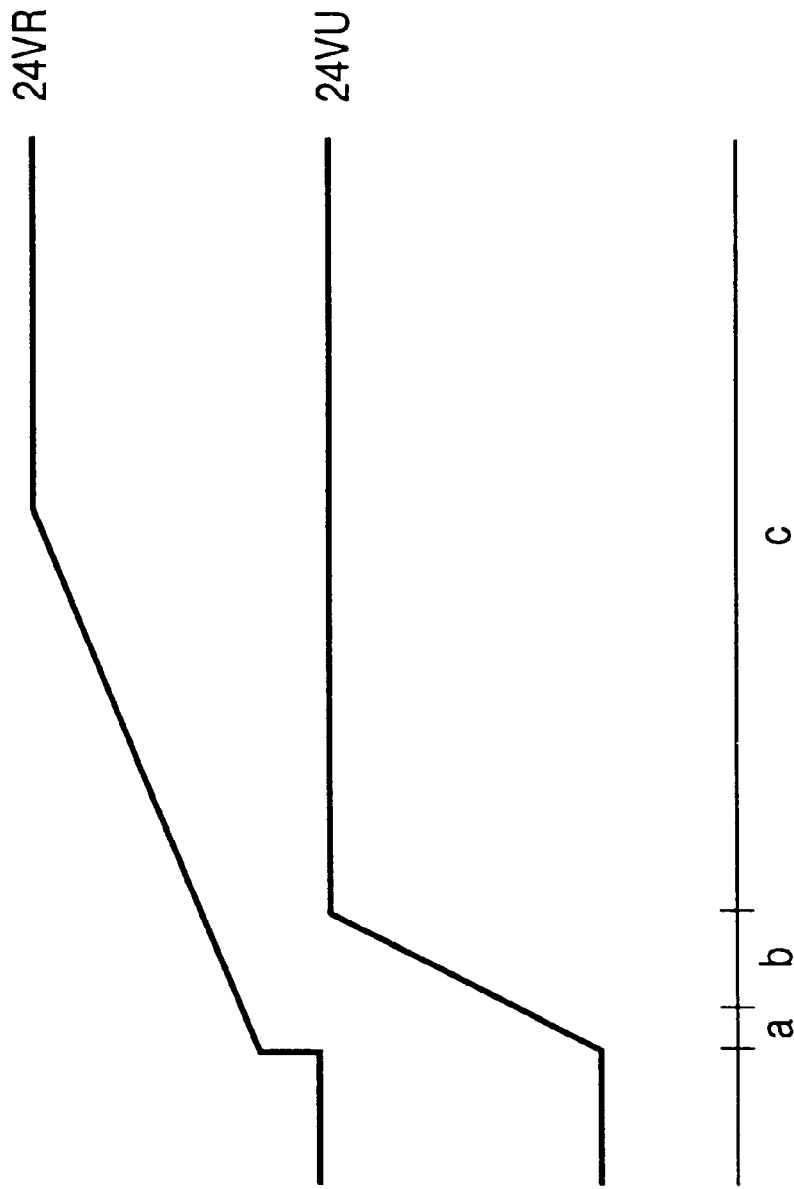
Figures 22A, 22B:
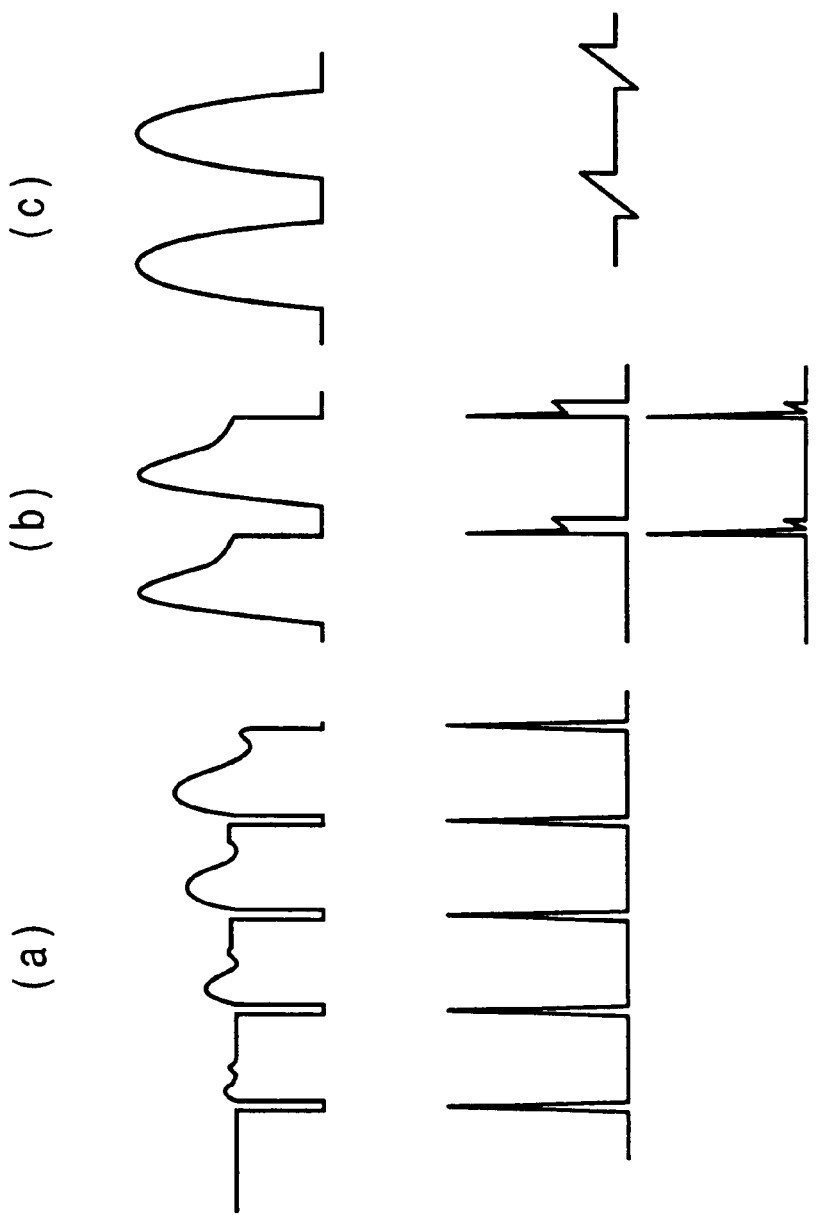

A first embodiment of the present invention is first explained with reference to FIGS. 1, 2A and 2B, and 3A to 3C. A basic configuration of a power circuit of the present embodiment excluding a constant voltage control circuit is identical to the configuration shown in FIG. 18 and the explanation is made with reference thereto.

Figure 1:
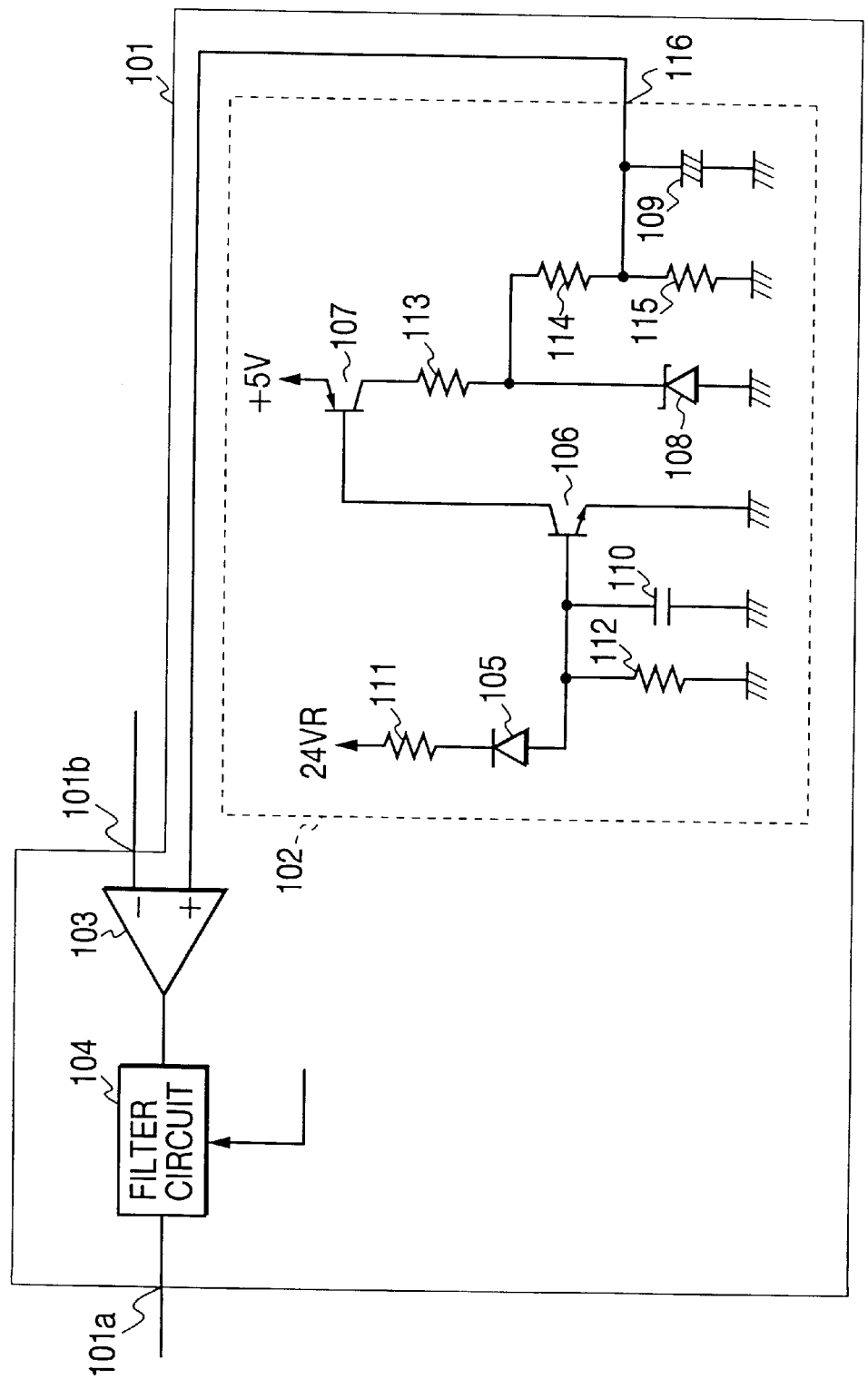
FIG. 1 shows a configuration of a constant voltage control circuit in a power circuit in accordance with a first embodiment of the present invention.

FIG. 1 shows a block diagram of a configuration of a constant voltage control circuit in the power circuit in accordance with the first embodiment of the present invention. In FIG. 1, numeral 101 denotes a constant voltage control circuit which comprises a controlling compare voltage generation circuit 102, a comparator 103 and a filter circuit 104.

The controlling compare voltage generation circuit 102 comprises a zener diode 105, transistors 106 and 106, a reference voltage generating element 108, capacitors 109 and 110 and resistors 111, 112, 113, 114 and 115. Numeral 101a denotes a drive signal output circuit of 24 VU switching element 14 and numeral 101b denotes a 24 VU filtered output detection signal input circuit.

The zener diode 105 is an element to detect a 24 VR voltage and in the present embodiment, an on-voltage is 16 volts. At the start of the power, when a flyback output (hereinafter referred to as 24 VR) which is a main object to be controlled exceeds 16 volts, the zener diode 105 is turned on to turn on the succeeding stage transistors 106 and 107. As a result, a voltage is supplied to the reference voltage generation element 108 and the 24 VU constant voltage controlling compare voltage 116 is inputted to the succeeding stage comparator 103 to which the 24 VU filtered output detection output signal is inputted through the 24 VU filtered output detection input circuit 101b. The 24 VU constant voltage controlling compare voltage 116 and the 24 VU filtered output detection signal are compared by the comparator 103. A predetermined time constant circuit is provided in the output circuit of the compare voltage 116 so that the soft start with a predetermined gradient is attained.

This manner is shown in FIGS. 2A and 2B. FIG. 2A shows the 24 VR output and FIG. 2B shows the 24 VU output. As described above, since the 24 VU compare voltage conducts the soft-up, the 24 VU output voltage also conducts the same soft-up by the constant voltage control. PWM signals of a main control loop, 24 VU conduction control signals (the drive signals of the 24 VU switching element 14) and output timings of the drive current of the primary circuit switching element 4 in periods a, b and c of FIG. 2B are shown in FIGS. 3A to 3C. FIG. 3A shows the 24 VU conduction control signals, FIG. 3B shows the PWM signals of the main control loop and FIG. 3C shows the drive currents of the primary circuit switching element.

As the time shifts from the period a to the periods b and c, the on-duty of the main control signal MPWM for controlling the 24 VR gradually increases since the target voltage value is soft started. On the other hand, for the 24 VU conduction control signal, the control voltage value soft-starts when the 24 VR exceeds 16 volts as described above but the on-duty gradually increases as the time shifts from the period a to the periods b and C. Thus, even during the period a in which the 24 VU output voltage is low and the 24 VU winding output current and the time rise rate thereof are large, the on-time of the switching element 14 which is the 24 VU conduction control element is held short and the primary circuit maximum peak current is suppressed to not higher than the predetermined value. In FIGS. 3A to 3C, there are two gradients in the drive current of the primary circuit switching element 4 because there are a period in which only the 24 VR flyback energy drive signal flows and a period in which the switching element 14 which is the 24 VU conduction control element is turned on and the charging current of the 24 VU output filtering capacitor 17 is superimposed. The gradient of the charging current of the 24 VU output filtering capacitor 17 becomes smaller as the 24 VU voltage increases and finally reaches substantially zero (in the period when the 24 VU external load 9 is not on. When the external load 9 is on, the current therefor is superimposed) and only the 24 VR drive current remains.

In accordance with the power circuit of the present embodiment, the 24 VR is monitored and the 24 VU controlling compare voltage value is soft-started when the 24 VR exceeds the predetermined value. Thus, the control of the forward winding 23 is always started when the main control loop enters the normal control state, the large charging current of the forward winding 23 at the start can be soft-started and the current load of the primary circuit drive current can be reduced.

Second Embodiment

A second embodiment of the present invention is now explained with reference to FIGS. 4 and 5A to 5D. A basic configuration of the power circuit of the present embodiment excluding the constant voltage control circuit is identical to the configuration shown in FIG. 18 and the explanation is made with reference thereto.

In the first embodiment described above, the soft-start of the 24 VU controlling compare voltage is one feature. The second embodiment is featured by that a maximum conduction period of a secondary circuit forward winding 23 can be controlled under a predetermined condition for a comparison result of a target voltage value and a detected voltage value.

Figure 4:
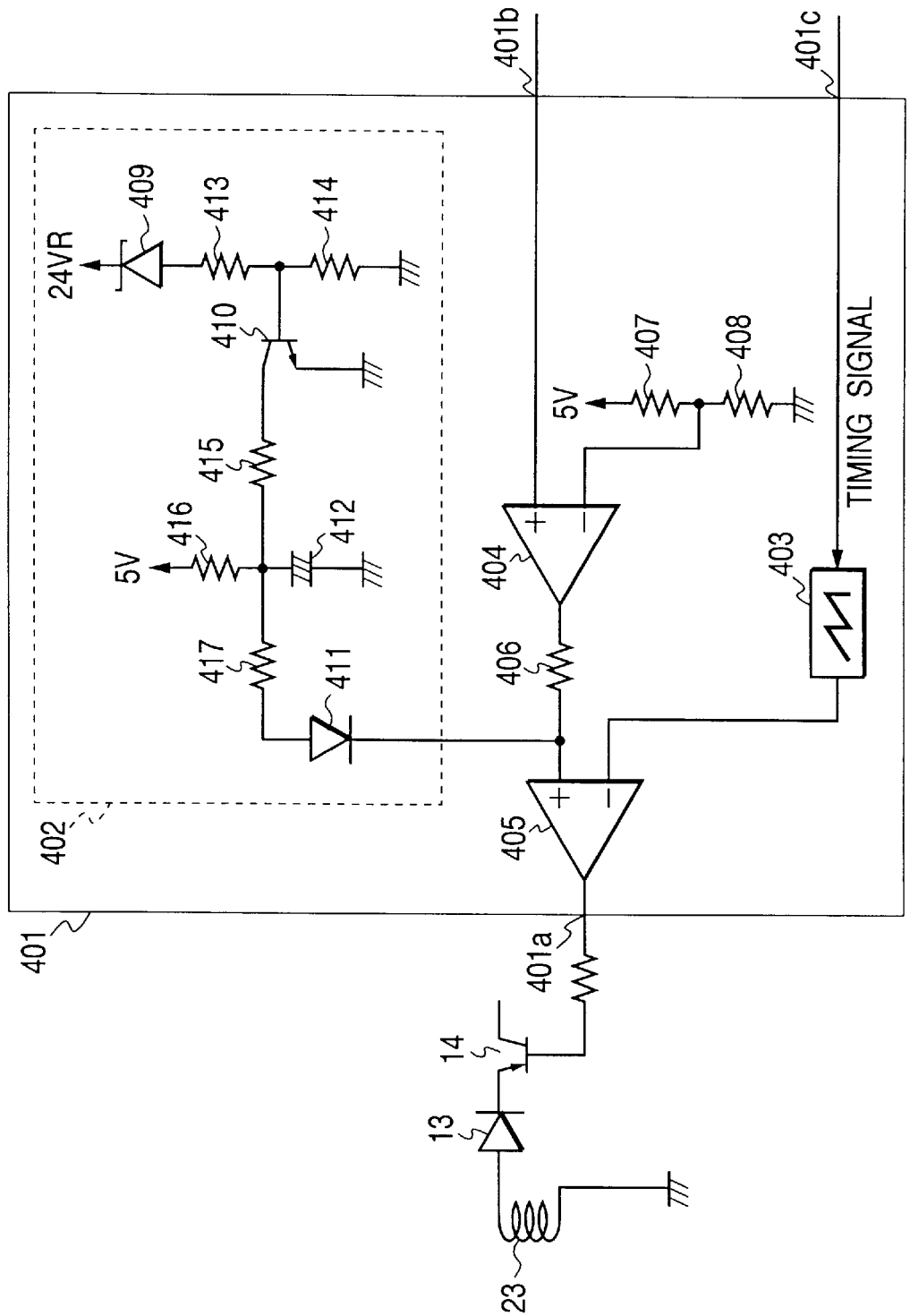
FIG. 4 shows a configuration of a constant voltage control circuit in a power circuit in accordance with a second embodiment of the present invention.

FIG. 4 shows a block diagram of a configuration of a constant voltage control circuit in the power circuit in accordance with the second embodiment of the present invention. In FIG. 4, numeral 401 denotes a constant voltage control circuit which comprises a slice level limit circuit 402, a ramp wave generation circuit 403, comparators 404 and 405 and resistors 406, 407 and 408. Numeral 401a denotes a drive signal output circuit of a 24 VU switching element 14, numeral 401b denotes a 24 VU filtered output detection signal input circuit and numeral 401c denotes a drive signal input circuit of the switching element 4.

The ramp wave generation circuit 403 generates a ramp wave at a phase as shown in FIGS. 5A to 5D in reference to a zero-crossing timing signal of a primary circuit flyback waveform of the transformer 20 inputted from the drive signal input circuit 401c. FIG. 5A shows a signal in the primary circuit of the transformer 20, FIG. 5B shows a drive signal applied to a base of the switching element 4, FIG. 5C shows a ramp wave generated by the ramp wave generation circuit 403 and FIG. 5D shows a drive signal outputted from the drive signal output circuit 401a.

The comparator 404 compares the compare voltage and the detected voltage inputted through the 24 VU filtered output detection signal input circuit 401b. The comparator 405 compares the output of the ramp wave generation circuit 403 and the output of the comparator 404 to generate a 24 VU winding conduction controlling PWM signal (the drive signal of the 24 VU switching element 14). In a steady state, the output of the comparator 404 slices the ramp wave at a predetermined analog level to generate the 24 VU winding conduction controlling PWM signal.

A function of the limit circuit 402 which is a feature of the present embodiment is now explained.

The limit circuit comprises a zener diode 409, a transistor 410, a diode 411, a capacitor 412 and resistors 413, 414, 415, 416 and 417. The zener diode 409 is an element to monitor the 24 VR voltage, and in the present embodiment, the zener voltage is 16 volts. When the 24 VR output is not higher than 16 volts, the transistor 410 is turned off and a voltage of 5 volts is charged to the capacitor 412 of the time constant circuit. Under this condition, even the comparison result of the compare voltage and the detected voltage by the comparator 404 is at L-level before the rise of the 24 VU voltage, a function to forcibly sets the slice level for the ramp wave such that the conduction period of the 24 VU winding output is 0 or lower than the predetermined value may be attained by the balance of the resistor 406, the resistor 416 and the forward voltage of the diode 411.

FIG. 5C shows this manner, in which b shows a slice level in the first embodiment described above with only the comparator 404 and a shows a slice level in the present embodiment.

The 24 VR is started and when the output thereof exceeds 16 volts, the transistor 410 is turned on and when the voltage of the capacitor 412 becomes not higher than the output voltage from the comparator 404, the operation of the limit circuit 402 is completed. The time constant circuit is set to an appropriate time constant while taking the 24 VU rise rate.

In this manner, the conduction angle of the forward winding 23 is soft-started in connection with the 24 VR start state as it is in FIGS. 3A to 3C of the first embodiment.

Third Embodiment

A third embodiment of the present invention is now explained with reference to FIG. 6. A basic is identical to the configuration shown in configuration of the power circuit of the present embodiment excluding the constant voltage control circuit is identical to the configuration shown in FIG. 18 and the explanation is made with reference thereto.

A feature of the present embodiment resides in that a voltage monitored in a slice level limit circuit is 24 VU itself.

Figure 6:
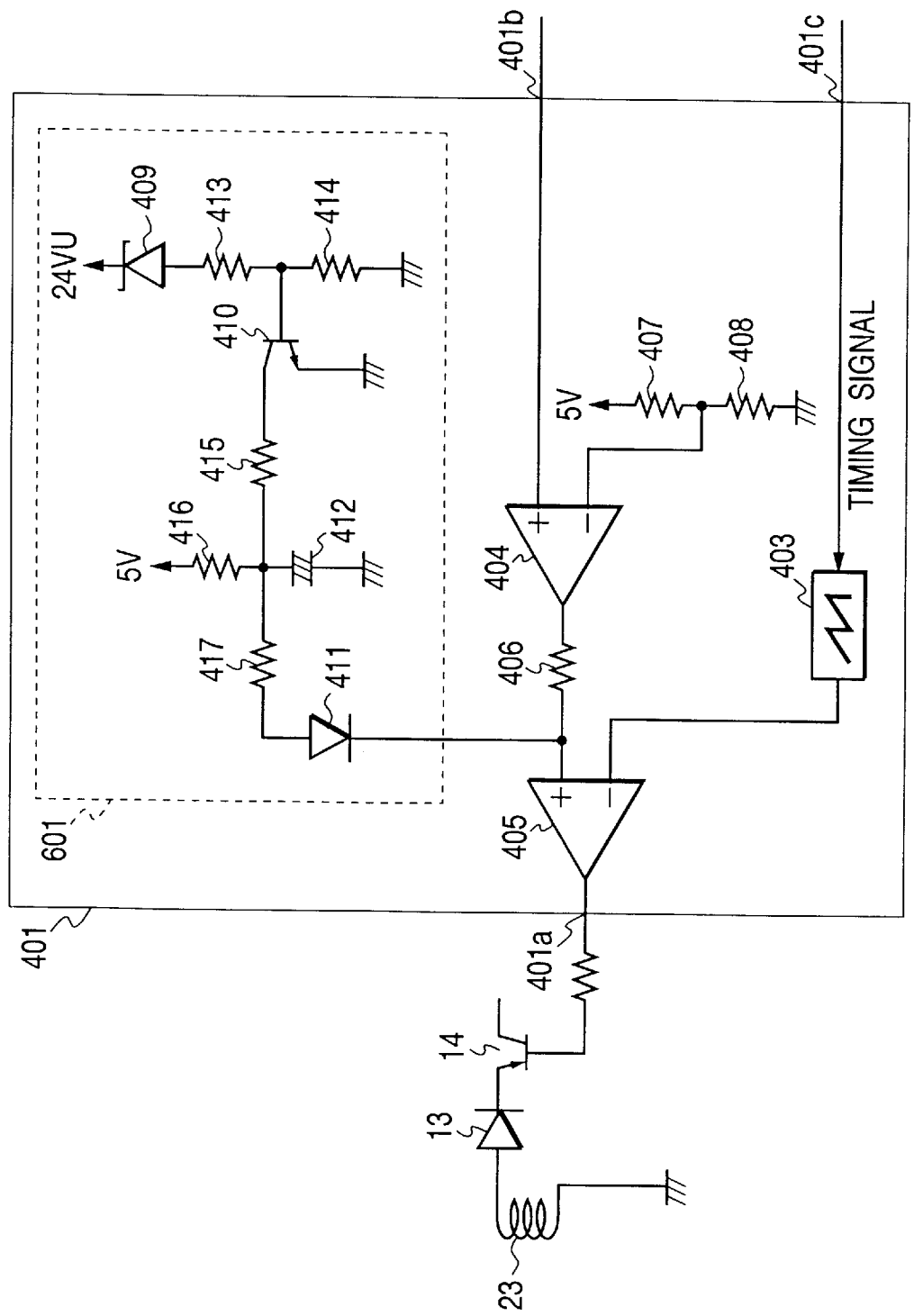
FIG. 6 shows a block diagram of a configuration of a constant voltage control circuit in a power circuit in accordance with a third embodiment of the present invention, FIG. 7 show a block diagram of a configuration of a power circuit in accordance with a fourth embodiment of the present invention.

FIG. 6 shows a block diagram of a configuration of the constant voltage control circuit in the power circuit in accordance with the third embodiment of the present invention. In FIG. 6, the like numerals are used for the like components of FIG. 4 in the second embodiment described above. In FIG. 6, a difference from FIG. 4 is a configuration of the limit circuit. Namely, because the voltage to be monitored is the 24 VU itself, when the 24 VU is not higher than a predetermined value, a limit circuit 601 in the present embodiment forcibly shifts the slice level to limit the 24 VU winding conduction angle at the start to a predetermined value.

In the present embodiment, the time constant design is easier than in the second embodiment. Namely, in the present embodiment, the 24 VU winding conduction angle is forcibly limit to not higher than the predetermined value until the 24 VU itself rises to the predetermined value without regard to the 24 VU rise time, it is not necessary to consider the magnitude of the input voltage to the power unit (for example, commercial AC power line voltage), the magnitude of the capacitance of the 24 VU external load and the actual 24 VU rise time rate difference due to a difference of the magnitude of the load current when the external load is turned on during the 24 VU start.

Fourth Embodiment

A fourth embodiment of the present invention is now explained with reference to FIG. 7. A basic configuration of the power circuit of the present embodiment excluding the constant voltage control circuit is identical to the configuration of FIG. 18 described above and the explanation is made with reference thereto.

A feature of the present embodiment resides in that the on/off of the slice level limit function may by inputted from the main control unit 9 in a slice level limit circuit 701 for a ramp wave.

Figure 7:
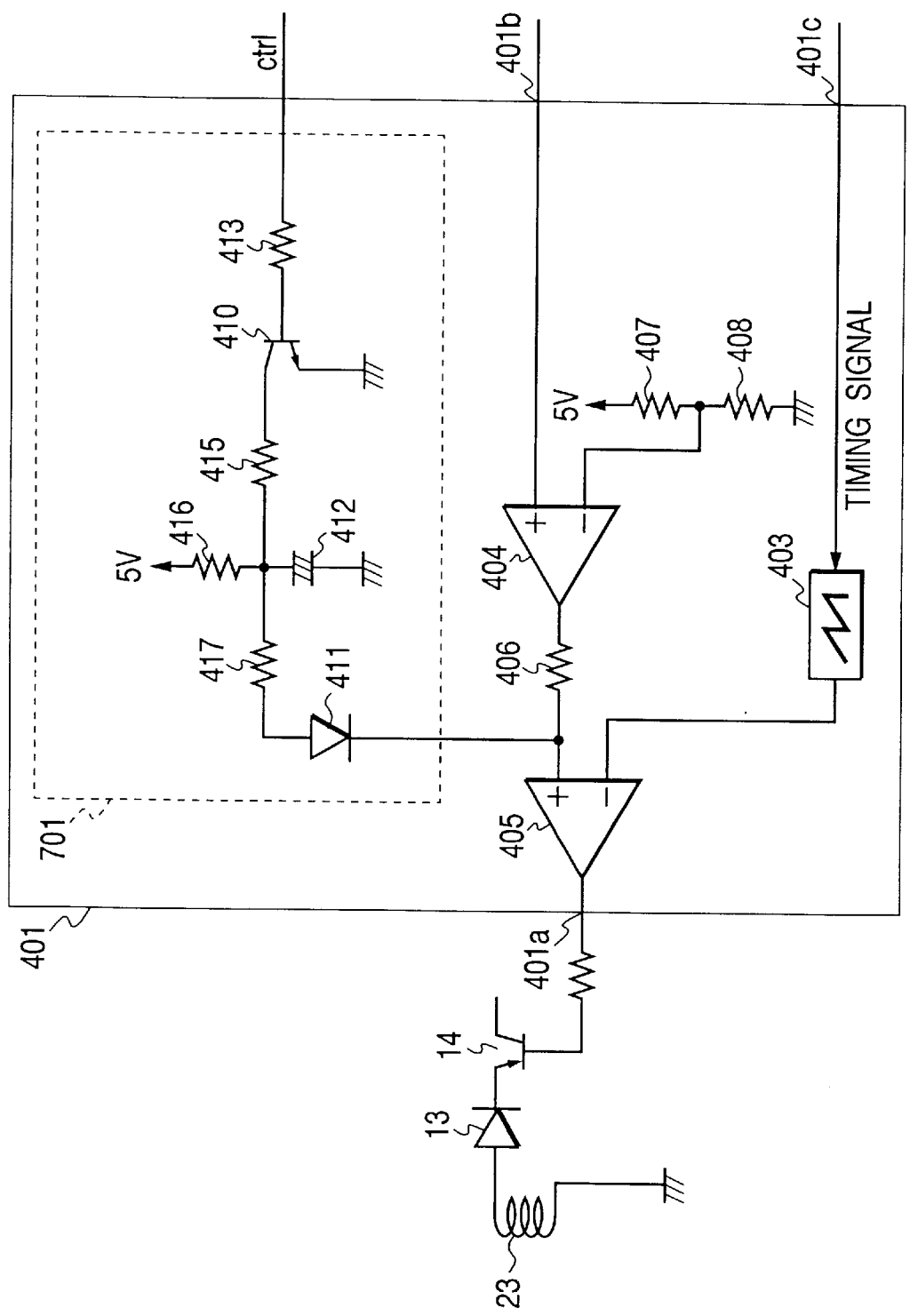

FIG. 7 shows a block diagram of a configuration of an output limit circuit in the power circuit in accordance with the fourth embodiment of the present invention. In FIG. 7, the like numerals are used for the like components to those of FIG. 6 in the third embodiment. The limit circuit 701 in the present embodiment, the zener diode 409 and the resistor 414 are eliminated from the configuration of the limit circuit 601 of FIG. 6 and the on/off control command for the slice level limit function is inputted from the main control unit 9. The main control unit 9 conducts the 24 VR control and can recognize the 24 VR control state (on, off, start). Thus, for example, a process to suppress the function of the limit circuit 701 a predetermined time after the 24 VR has reached a predetermined voltage.

Fifth Embodiment

A fifth embodiment of the present invention is now explained with reference to FIGS. 8 to 10.

Figure 8:
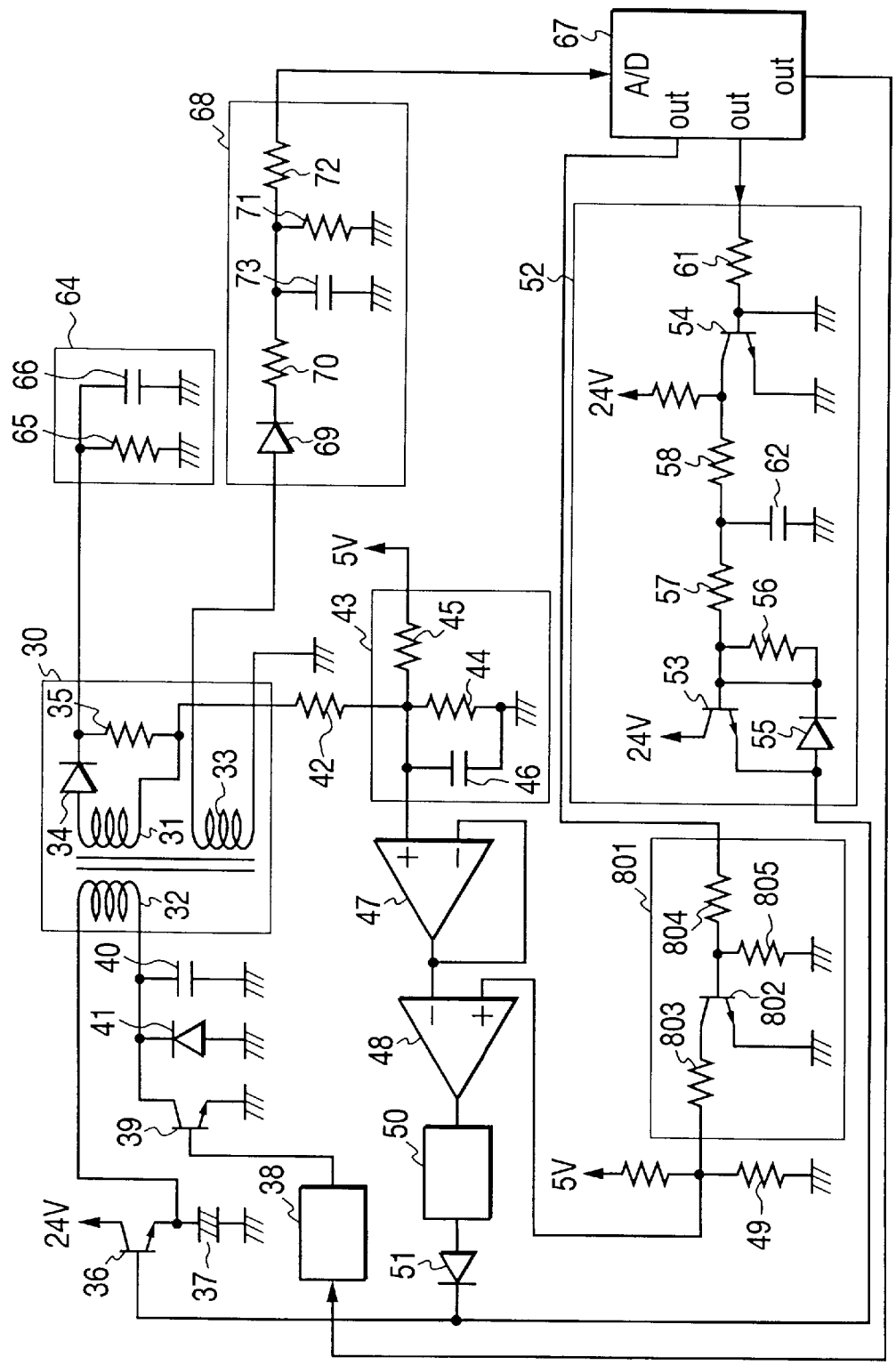
FIG. 8 shows a block diagram of a configuration of a power circuit in accordance with a fifth embodiment of the present invention.
Figure 9:
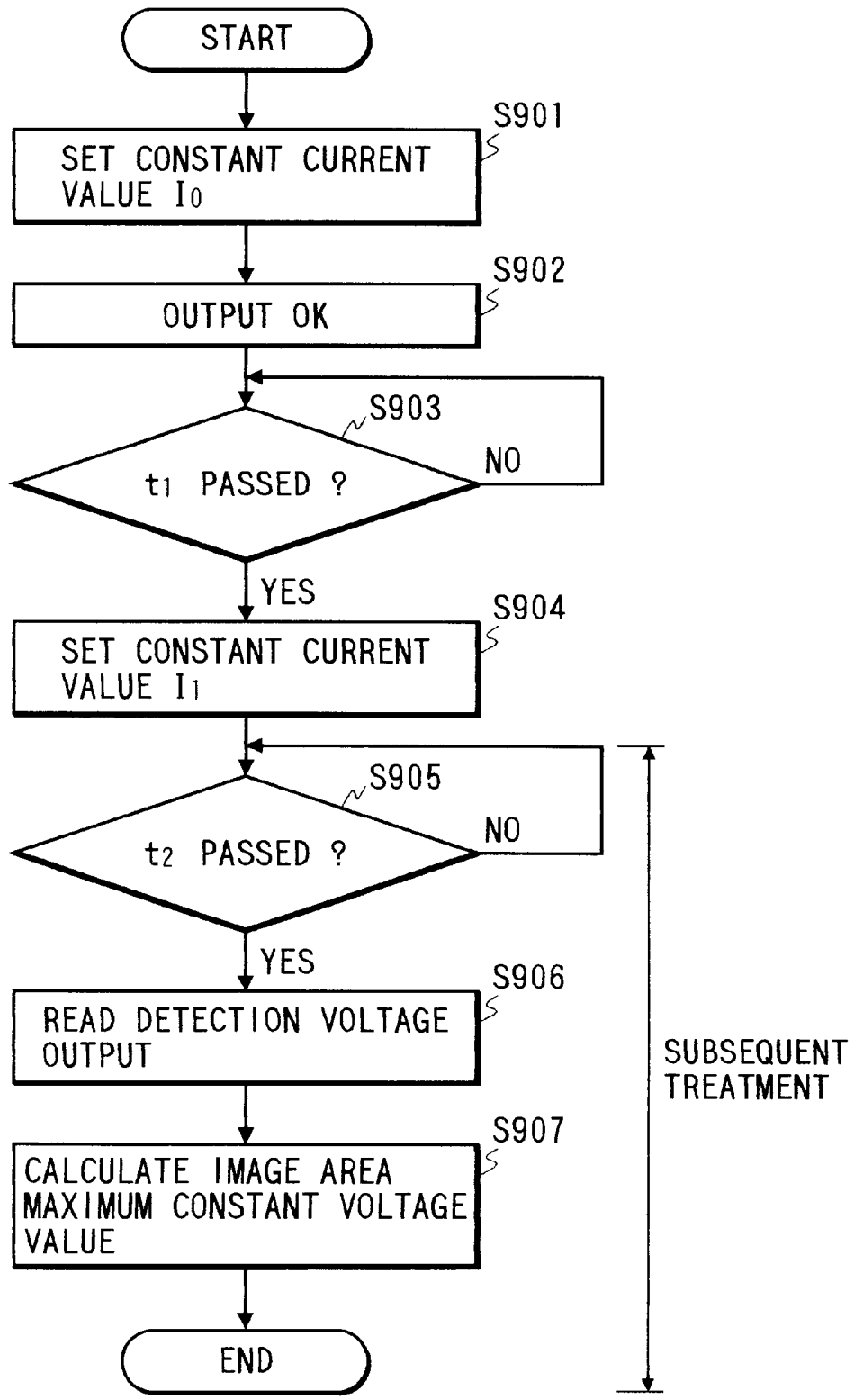
FIG. 9 shows a flow chart of an operation control procedure of the power circuit in accordance with the fifth embodiment.
Figure 23:
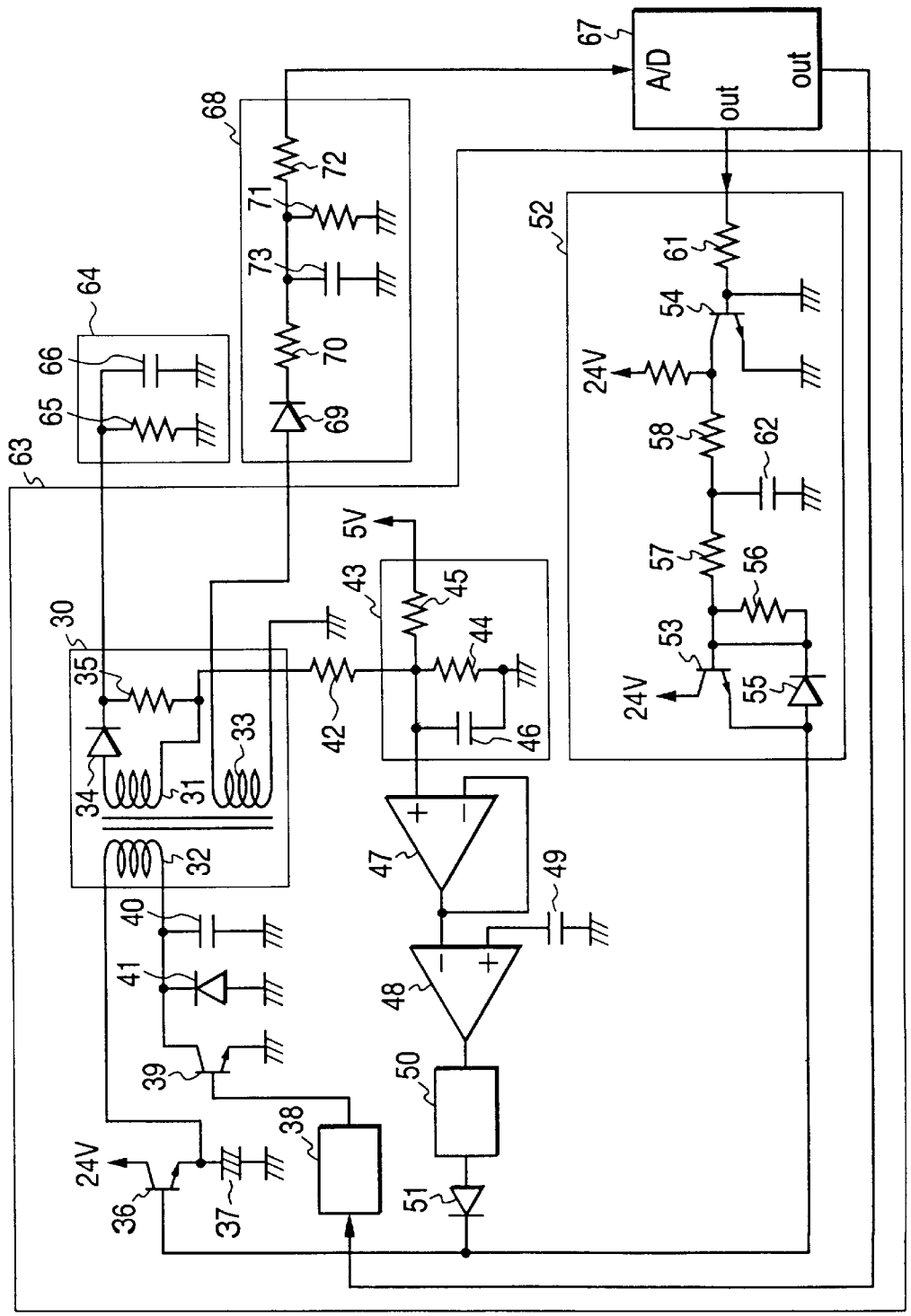
FIG. 23 shows a block diagram of a configuration of a prior art power circuit different from that of FIG. 18.

FIG. 8 shows a block diagram of a configuration of a power circuit in accordance with the fifth embodiment of the present invention. In FIG. 8, the like components to those of FIG. 23 described above are designated by the like numerals. In FIG. 8, a difference from FIG. 24 resides in that a constant current set value switching circuit 801 is added to the configuration of FIG. 23 so that the current set value of the constant current control circuit may be set in two steps by a power controller 67 through the constant current set value switching circuit 801.

An operation of the power circuit in accordance with the present embodiment is now explained with reference to FIGS. 8, 9 and 10. FIG. 9 shows a flow chart of an operation control procedure of the power circuit in accordance with the present embodiment. FIG. 10 shows curves of time change of an output voltage for illustrating an operation outline of the power circuit in accordance with the present embodiment. In the example of FIG. 10, in order to illustrate a charging rate to a load capacitance by the constant current control circuit, the voltage rise waveform is represented linearly for an appropriate period after the start and then it is approximated by a curve close to exponential.

First, the power controller 67 receives a load resistance measurement start command. Then, the power controller 67 sets the current set value of the constant current control circuit to I0 which is twice as large as a final target current I1 (step S901). In the present embodiment, it corresponds to the outputting of the on-signal for the transistor 802 of the constant current set value switching circuit by the power controller 67. Thereafter, the on-signal is outputted to the oscillation circuit 38 to start the high voltage output (step S902). At this time, the output voltage rises at a gradient which is twice as large as the rise b in case it is started with the final target I1 as shown in a of FIG. 10.

In a step S903, the power controller 67 measures the elapse time after the start of output and determines whether a predetermined time t1 has elapsed or not based on the measurement result. When the predetermined time t1 has elapsed, the constant current set value is switched to I1 (step S904). The final output voltage may be considered to vary within a range in which the variation of the final output constant current value and the load resistance component are normally included, and in the present embodiment, it is assumed from Va to Vb in FIG. 10.

Now, assuming a load to generate the final output voltage Va, the voltage rises at a gradient of approximately one half from the output voltage value Vc when the constant current set value is switched to I1, and reaches the final value.

Whether a predetermined time t2 has elapsed is determined based on the elapsed time measurement result after the start of output (step S905). When the predetermined time t2 has elapsed, the detection winding output is read (step S906), the image area maximum constant voltage value is calculated and the present process is completed. Thus, the load capacitance is substantially fully charged and the output voltage is substantially constant.

Since the periods required to reach Vch are different approximately twice when the initial constant current value is set to I0 and I1, the time to reach the final voltage value may be shortened by approximately t1 in the present embodiment.

Figure 10:
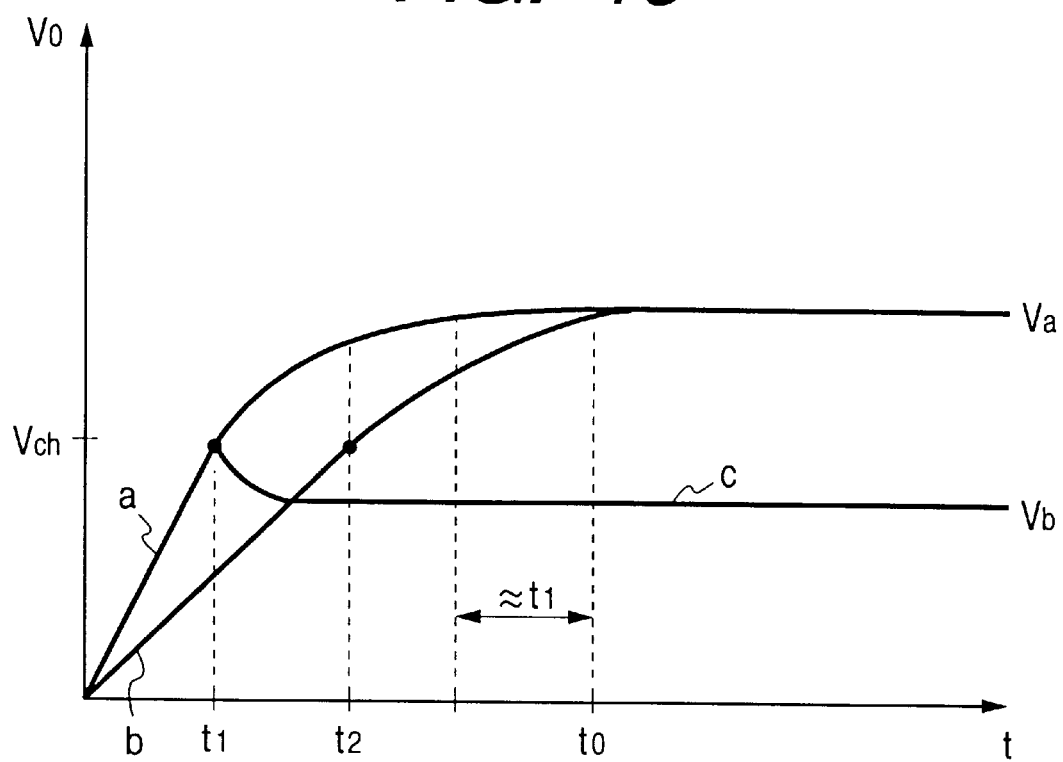
FIG. 10 shows operation outline of the power circuit in accordance with the fifth embodiment.

For the load which generate the final output Vb, a straight line as shown in c of FIG. 10 is exhibited after the switching to the constant current set value I1, and the discharge portion of a bleeder resistor in the high voltage transformer 30 is added to the time constant of the voltage change so that the response is faster and the final value is reached rapidly.

Sixth Embodiment

A sixth embodiment of the present invention is now explained with reference to FIGS. 11 and 12. A basic configuration of the power circuit in accordance with the present embodiment is identical to that of FIG. 8 of the fifth embodiment described above and the explanation is made with reference thereto.

Figure 12:
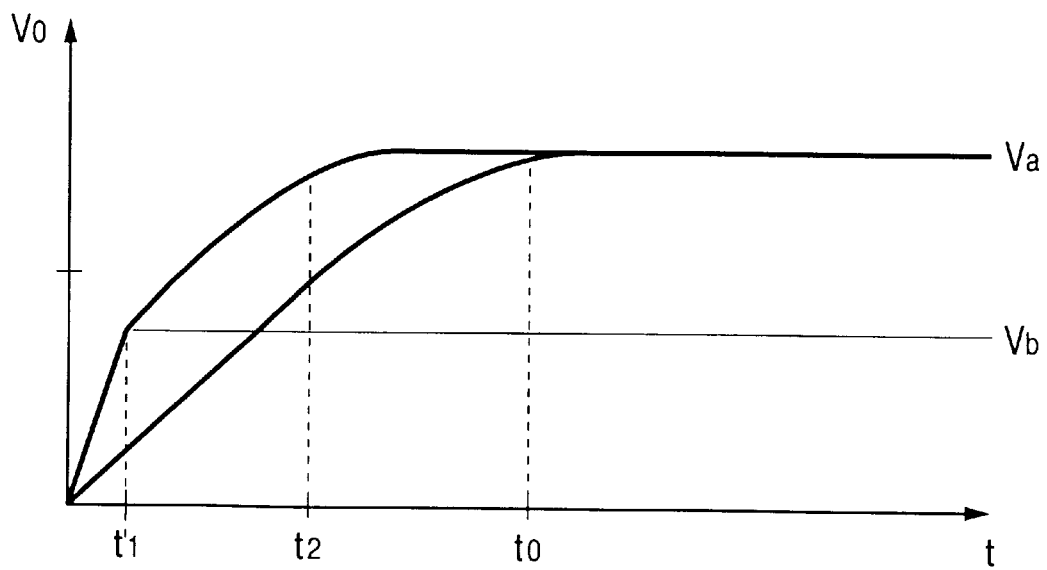
FIG. 12 shows operation outline of the power circuit in accordance with the sixth embodiment.
Figure 11:
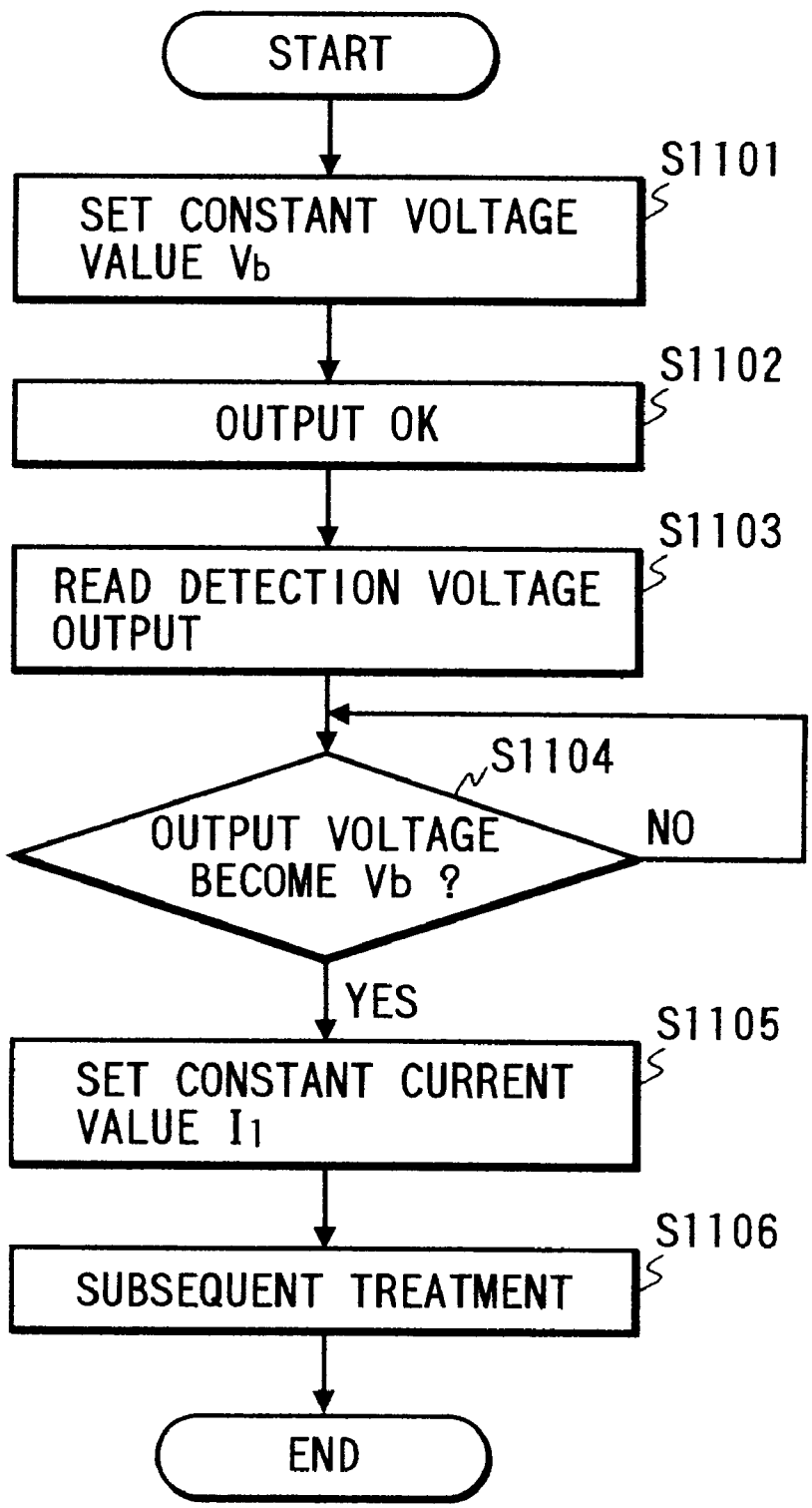
FIG. 11 shows a flow chart of an operation control procedure of a power circuit in accordance with a sixth embodiment of the present invention.

FIG. 11 shows a flow chart of an operation control procedure of the power circuit in accordance with the present embodiment and FIG. 12 shows curves of time change of the output voltage for illustrating an operation outline of the power circuit in accordance with the present embodiment.

First, a load resistance measurement start command is received from the external controller. Then, in FIG. 11, the controller 67 sets the constant voltage value to Vb (step S1101) to start the control by the constant voltage control mode to maintain the output voltage at Vb constant. Thereafter, the on-signal is outputted to the oscillation circuit 38 (step S1102), the detection winding output is sequentially read to attain the detection output voltage corresponding to the output voltage Vb (step S1103), it is inputted to the A/D terminal through the rectifying/filtering circuit 68 and whether the output voltage reaches Vb or not is monitored (step S1104). The result thereof is outputted to the constant voltage control circuit 52 to switch the on/off rate of the output port to change the output voltage level. The circuit operation at this time may be considered to raise the output voltage toward the target voltage value at a maximum capability of the power circuit without regard to the load current. When the output voltage reaches Vb, the power controller 67 switches the constant current set value to I1 (step S1105) and turns off (0 volt) the output of the constant voltage control circuit 52 to switch the power circuit to the constant current mode. Thus, the constant current control loop functions to attain the target constant current value from Vb and the same post process as that of the steps S905 to S907 of FIG. 9 in the fifth embodiment described above is conducted (step S1106).

In accordance with the power circuit of the present embodiment, since the output voltage is raised at the maximum output capability of the power circuit until the output voltage reaches Vb, the voltage rise before the switching to the constant current mode may be made fastest. By setting a voltage which is a product of the lowest resistance of the normal variation range and a desired constant current as Vb, a transient voltage overshoot becomes very small.

Seventh Embodiment

Figure 13:
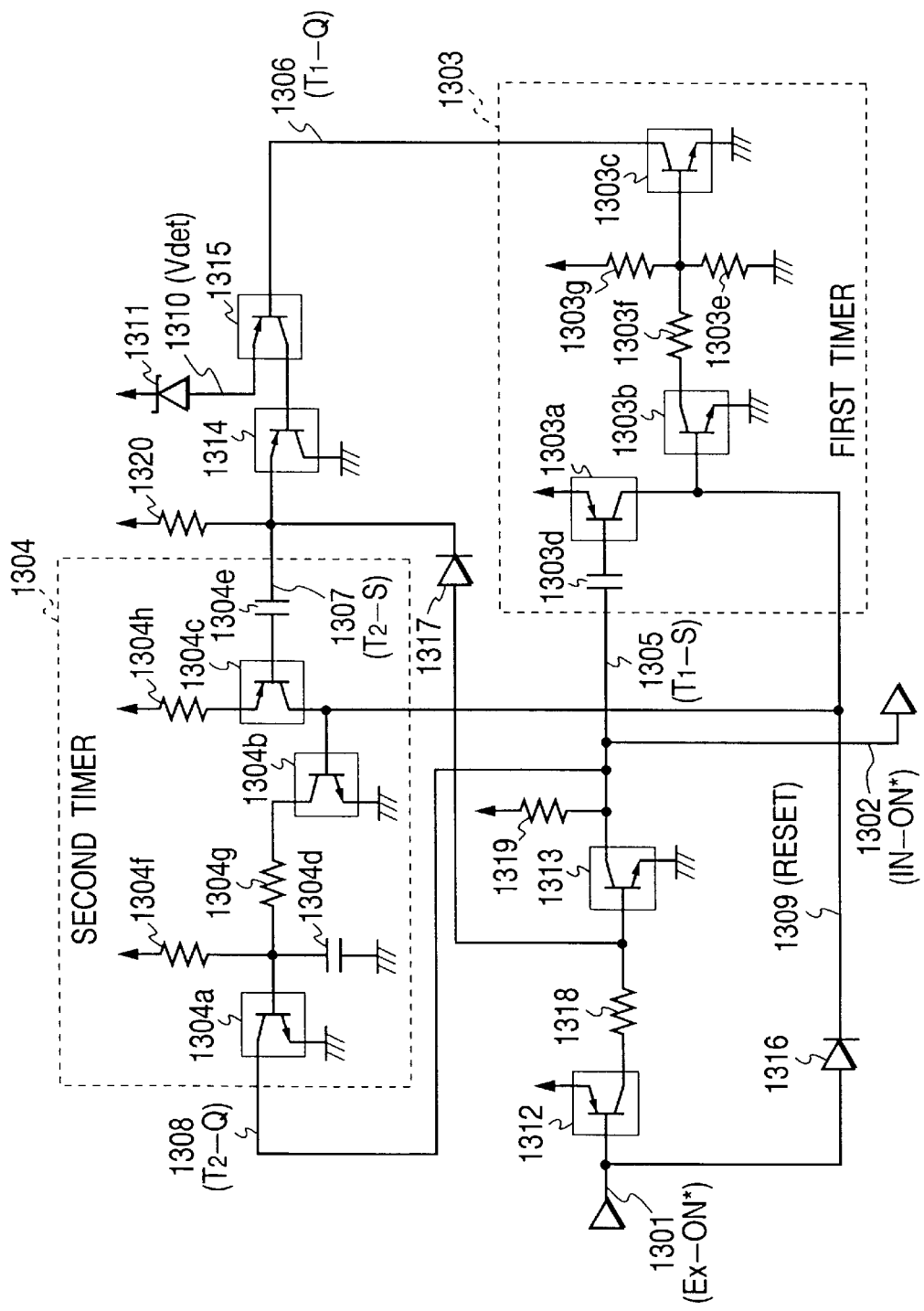
FIG. 13 shows a block diagram of a configuration of an output limit circuit in a power circuit in accordance with a seventh embodiment of the present invention.

A seventh embodiment of the present invention is now explained with reference to FIGS. 13 and 14A to 14F. FIG. 13 shows a block diagram of a configuration of an output limit circuit in the power circuit in accordance with the seventh embodiment of the present invention.

In FIG. 13, numeral 1301 denotes an external signal for commanding the on/off of the high voltage output from the external control unit to the power circuit. In FIG. 13, it is represented by EX-ON* and it is logically defined to output-off at H (high level) and output-on at L (low level). Numeral 1302 denotes an internal signal for actually turning on and off the operation of the high voltage circuit in response to the EX-ON* signal. It is represented by IN-ON* and logically defined to output-off at H (high level) and output-on at L (low level). Numeral 1303 denotes a first timer which in response to L of the EX-ON*, measures a time to render the IN-ON* L for a predetermined period after the IN-ON* becomes L to render the IN-ON. The first timer 1303 comprises transistors 1303a, 1303b and 1303c, capacitors 1303d and 1303e and resistors 1303f and 1303g.

In FIG. 13, numeral 1304 denotes a second timer which render the IN-ON* to H for a predetermined time when it is detected by the load current detection means that the load current of only a predetermined value flows after the IN-ON* has been rendered to L for the predetermined time by the first timer 1303. The second timer comprises transistors 1304a, 1304b and 1304c, capacitors 1304d and 1304e and resistors 1304f, 1304g and 1304h.

Figure 24:
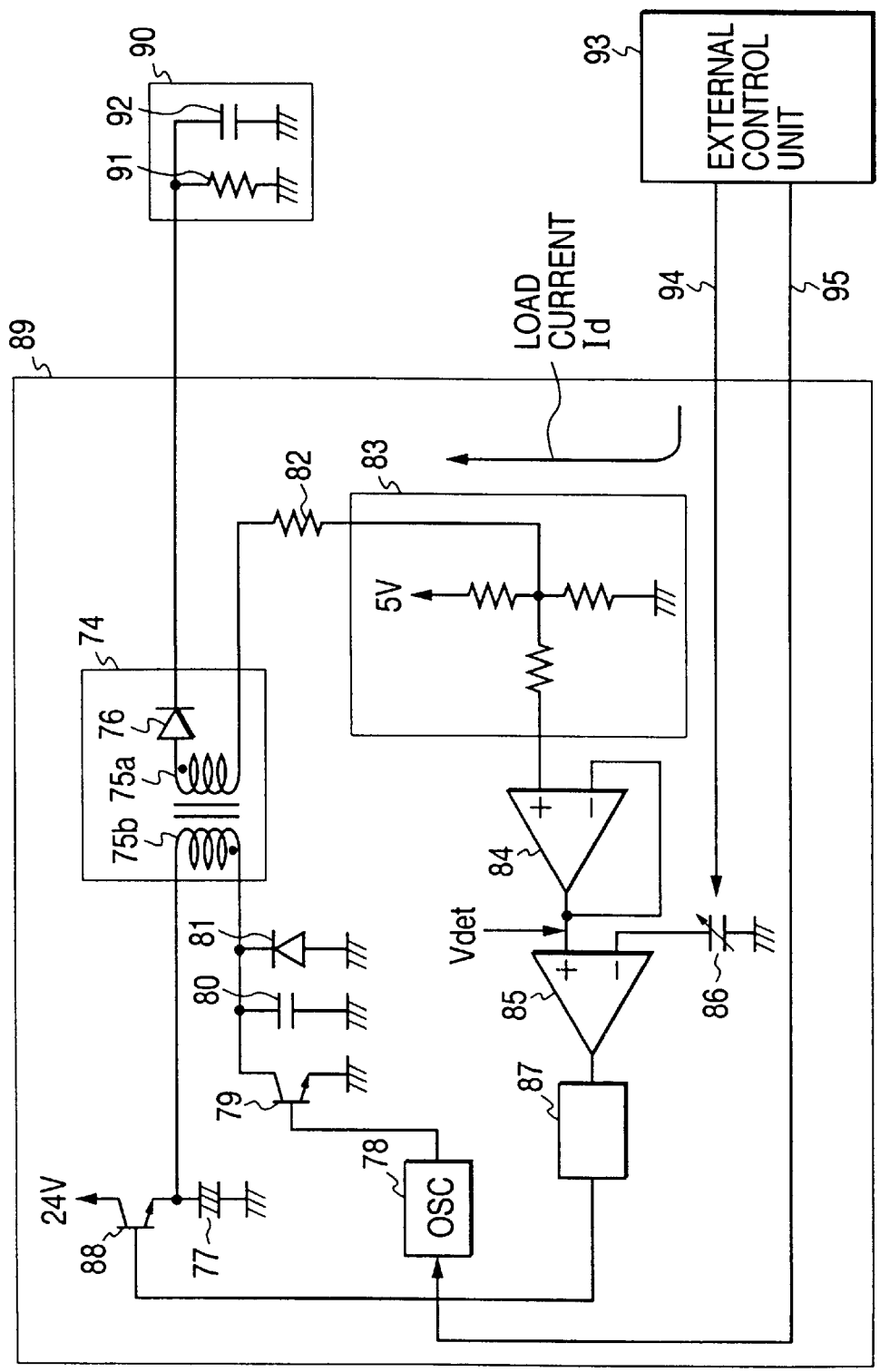
FIG. 24 shows a block diagram of a configuration of a prior art power circuit different from those of FIGS. 18 and 23.
Figure 25:
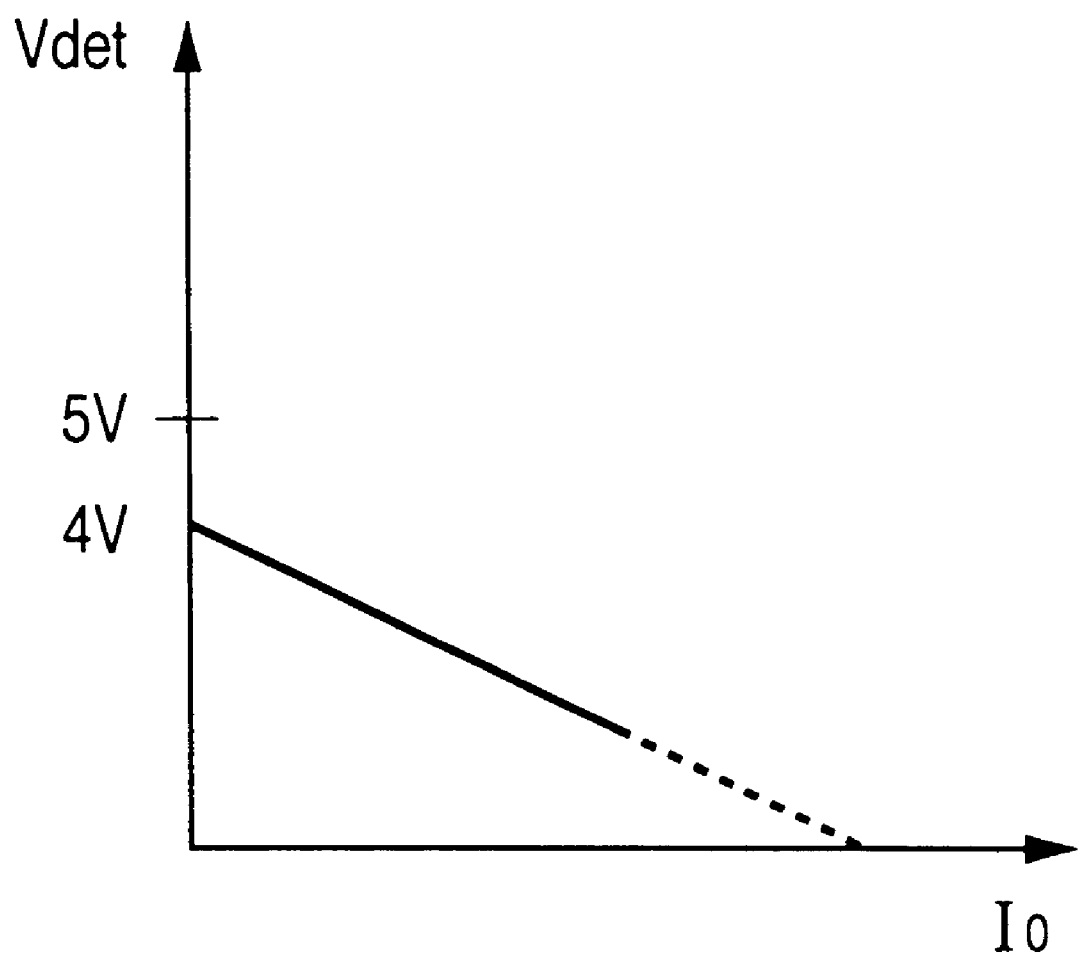
FIG. 25 shows a current-voltage characteristic of a load detection circuit in the prior art power circuit shown in FIG. 24.

Further, in FIG. 13, numeral 1305 denotes a signal (T1-S) for starting the first timer 1303, numeral 1306 denotes a measurement result signal (T1-Q) of the first timer 1303, numeral 1307 denotes a signal (T2-S) for starting the second timer 1304, numeral 1308 denotes a measurement result signal (T2-Q) of the second timer 1304b, numeral 1309 denotes a signal (RESET) for resetting the time measurement operation of the first timer 1303 and the second timer 1304, numeral 1310 denotes an output signal (Vdet) from the load current detection means, which in the present embodiment, is assumed to exhibit a voltage-current characteristic as shown in FIG. 24, numeral 1311 denotes voltage discrimination means for determining whether the load current is lower than or larger than the predetermined value or not, which in the present embodiment, a zener diode which is turned on at 2.4 volts.

Further, in FIG. 13, numerals 1312, 1313, 1314 and 1315 denote transistors, numerals 1316 and 1317 denote diodes and numerals 1318, 1319 and 1320 denote resistors.

Figure 14:
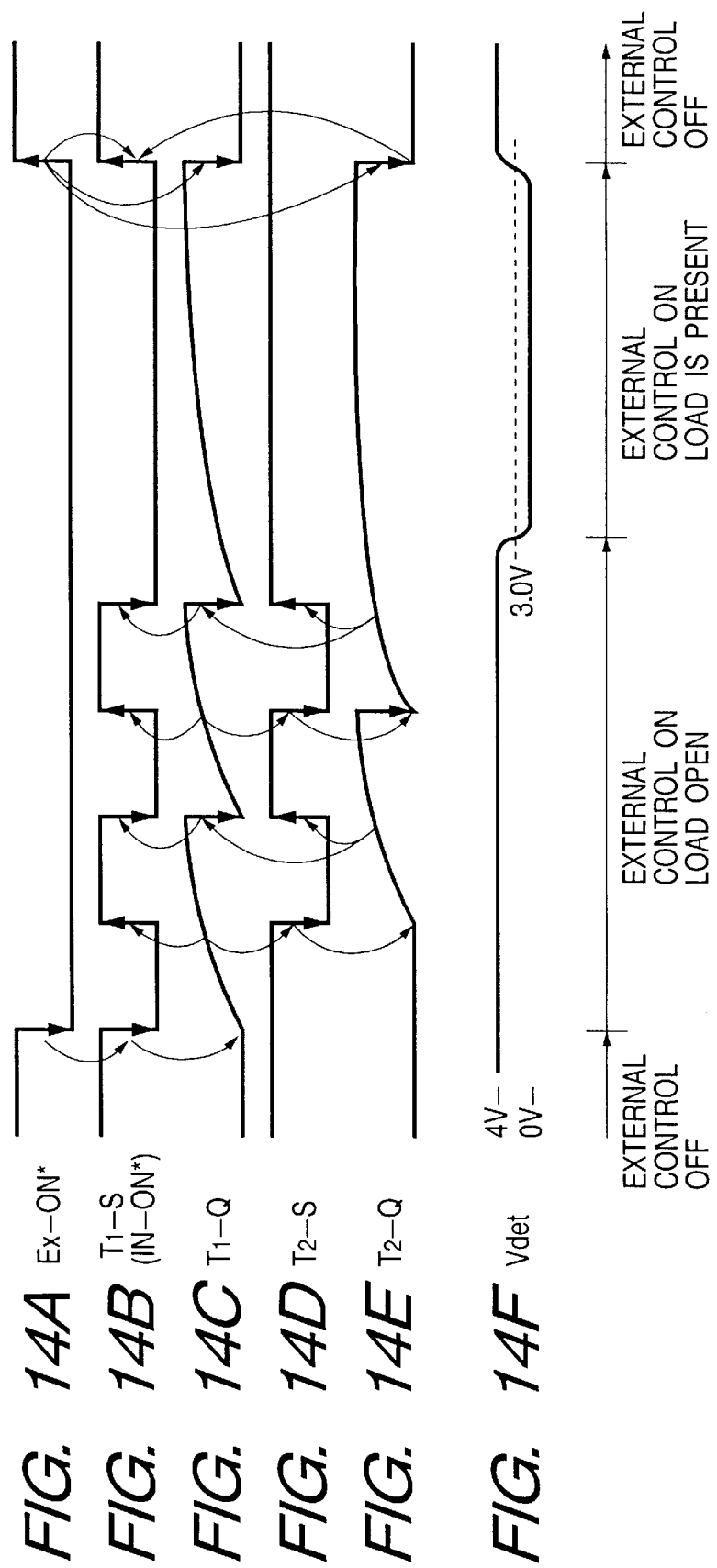
FIGS. 14A, 14B, 14C, 14D, 14E and 14F show output timings of signals in the power circuit in accordance with the seventh embodiment.

FIGS. 14A to 14F show time charts of output timings of respective signals in FIG. 13. FIG. 14A shows the EX-ON*, FIG. 14B shows the T1-S (IN-ON*), FIG. 14C shows the T1-Q, FIG. 14D shows the T2-S, FIG. 14E shows the T2-Q and FIG. 14F shows the Vdet.

An operation of the output limit circuit in the power circuit of the above configuration is now explained with reference to FIGS. 13 and 14A to 14F.

First, a steady state in which the external control signal EX-ON* is H and the high voltage output is off is assumed. Because of EX-ON*=H, RESET=H and both the first timer 1303 and the second timer 1304 are in the reset state and T1-Q and T2-Q are L. The IN-ON* is of course H and the high voltage output is off.

Then, it is assumed that the load current value is set (not shown in the time charts of FIGS. 14A to 14F) and then the EX-ON* is rendered to L. In response to EX-ON*=L, the RESET to both the timer 1303 and the timer 1304 is rendered to L and the reset state is released. Thus, IN-ON*=L and an operation to raise the output voltage until the high voltage circuit attains the predetermined load current is started. Simultaneously therewith, the T1-S becomes L and the first timer 1303 is triggered thereby to start the measurement of the time of IN-ON*.

When the first timer 1303 is timed up, the T1-Q gradually changes from L to H and if the load current of higher than the predetermined value does not flow at this time (in the present embodiment, Vdet is not larger than approximately 3 volts), the voltage detection means 1311 conducts in response thereto to turn on the two-stage transistors 1314 and 1315. In response thereto, the base input of the transistor 1313 in the preceding stage of the IN-ON* is rendered to L through the diode 1317 to forcibly return the IN-ON* to H to interrupt the high voltage output operation. Simultaneously therewith, the T2-S of the second timer becomes L to start the measurement of time to interrupt the high voltage output.

When the second timer is timed up, the T2-Q gradually changes from L to H to again render the IN-ON* to L to turn on the high voltage output, and the T1-S is rendered to L and the first timer 1303 is triggered thereby to start the time measurement of the IN-ON*=L. In a state in which the load resistance is larger than the predetermined value by some cause such as the disconnection of the load cable, the above operation is repeated while the external control signal EX-ON* is L. When the normal load is normally connected, the output from the load current detection means is not higher than the predetermined value, the voltage discrimination means 131 is turned off and the interrupt sequence of the high voltage output operation is avoided. When the external control signal EX-ON* is H, the state returns to the initial state and the high voltage output is turned off.

In this manner, in accordance with the power circuit of the present embodiment, when the load resistance becomes much higher than the normal value by the disconnection of the load cable, the output operation can be made intermittent independently in the power circuit.

Eighth Embodiment

An eighth embodiment of the present invention is now explained with reference to FIGS. 15 and 16. The power circuit in accordance with the present embodiment is applied when other functional blocks, for example, a low voltage power circuit, a fluorescent lamp inverter circuit and a heater control circuit are included and a complex sequence control therefor is required.

Figure 15:
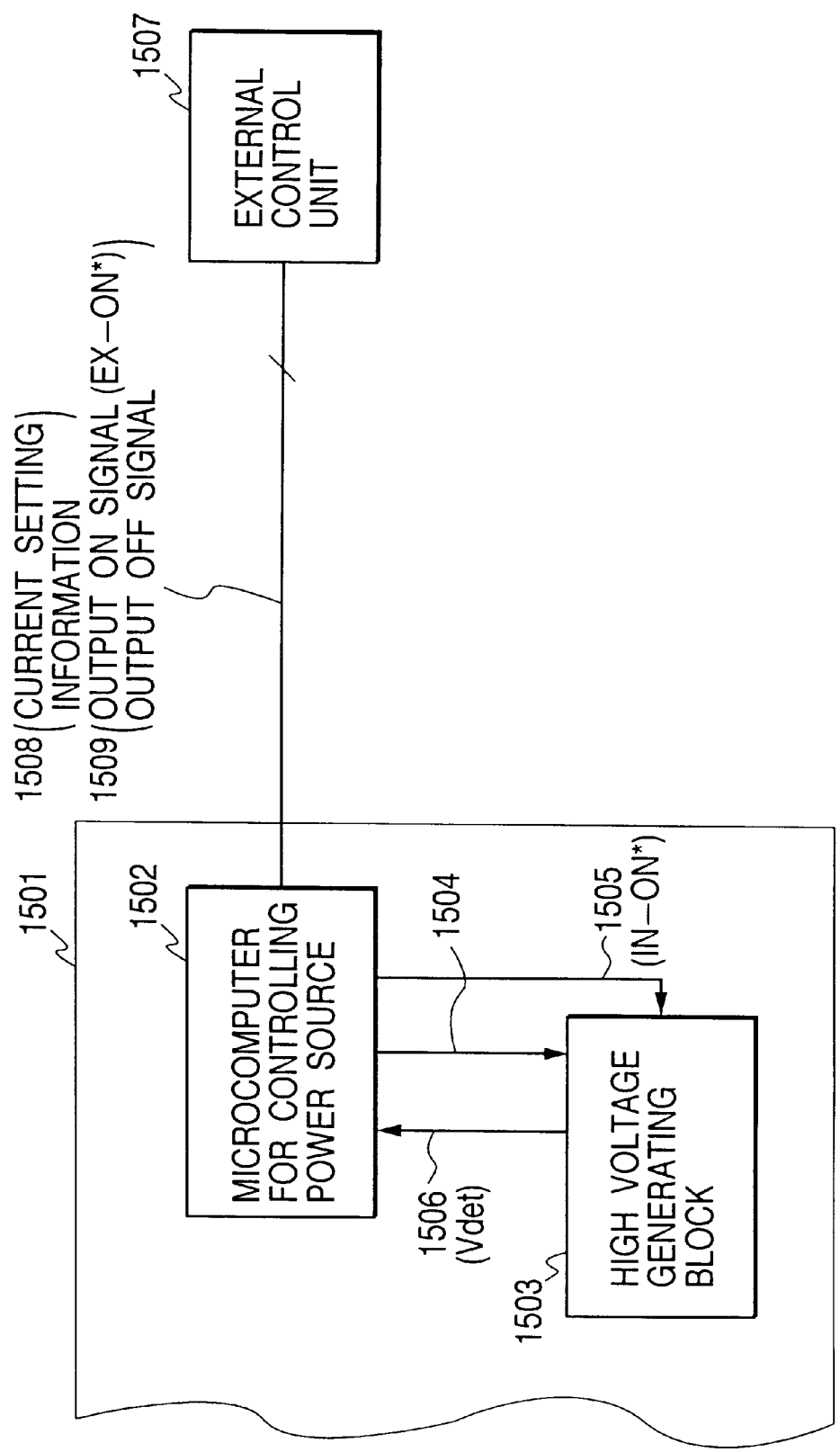
FIG. 15 shows a block diagram of a configuration of a power circuit in accordance with an eighth embodiment of the present invention.
Figure 16:
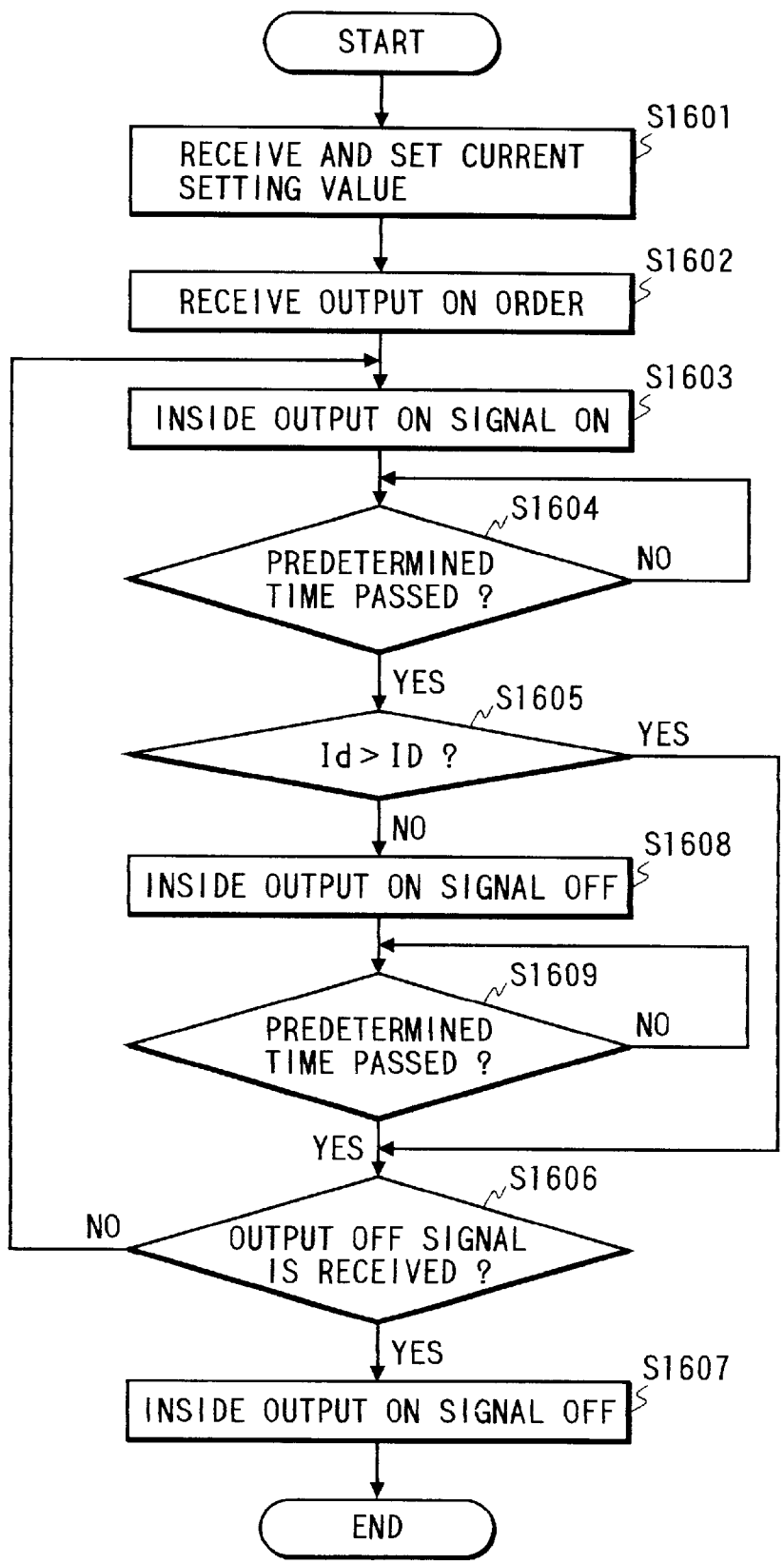
FIG. 16 shows a flow chart of an operation control procedure of the power circuit in accordance with the eight embodiment.

FIG. 15 shows a block diagram of a configuration of the power circuit in accordance with the eighth embodiment of the present invention. In FIG. 15, numeral 1501 denotes a power circuit which comprises a power controlling microcomputer (hereinafter referred to as a power controller) 1502 and a high voltage generation block 1503. The power controller 1502 conducts the overall control of the power circuit 1501. The high voltage generation block 1503 receives an output load current set signal 1504 outputted from the D/A port of the power controller 1502 and an internal output-on signal (IN-ON*) to conduct the high voltage generation operation. The output voltage Vdet from the load current detection means is read into the A/D port of the power controller 1502 from the high voltage generation block 1503. The external control unit 1507 is connected to the power controller 1502 and the load current set information 1508 and the output-on signal (EX-ON*)/output-off signal 1509 are sent from the external control unit 1507 to the power controller 1502.

An operation of the power controller 1502 in the power circuit in accordance with the present embodiment is now explained with reference to the flow chart of FIG. 16.

First, the load current set information 1508 and the output-on/off signal 1509 are sent to the power controller 1502 by the communication from the external control unit 1507 (various protocols and other detailed configurations may be used although they are not specifically referred here). In response thereto, the corresponding load current controlling target voltage 1504 is set for the high voltage generation block from the D/A port of the power controller (steps S1601 and S1602).

In the present embodiment, "FROM D/A PORT" is shown. For example, a PWM (pulse width modulation) signal having predetermined frequency and duty may be outputted from the output port and it may be applied to a low pass filter to produce an analog voltage.

Then, the internal output-on signal (IN-ON*) for conveying the turn-on of the output operation to the high voltage generation block 1503 is outputted (step S1603). In this manner, the high voltage generation block 1503 raises the output voltage so that the load current is maintained at the predetermined value. Thereafter, whether the predetermined time has elapsed or not is determined by the time management in the power controller 1502 (step S1604). Thereafter, the output voltage Vdet from the load current detection means is read from the A/D port of the power controller 1502 to determine whether the load current Id is higher than the predetermined value ID or not (step S1605). When the load current Id>ID, whether the output-off signal has been received from the external control unit or not is determined, and if it has been received, the internal output-on signal (IN-ON*) is turned off to complete the high voltage output operation. When the output-off signal is not received from the external control unit 1507, the process returns to the internal output-on signal (IN-ON*)=on sequence in the previous step S1603 after the elapse of the predetermined time to determine the load current.

On the other hand, when the load current Id<ID, the internal output-on signal (IN-ON*) is temporarily turned off for the predetermined time (step S1608) and a sequence to determine whether the output-off signal has been received from the external control unit or not is started and whether the predetermined time has elapsed or not is determined by the time management in the power controller 1502. Thereafter, a sequence to determine whether the output-off command signal has been received from the external control unit 1507 in the step S1606 is started and the same procedure as that described above is conducted.

Ninth Embodiment

Figure 17:
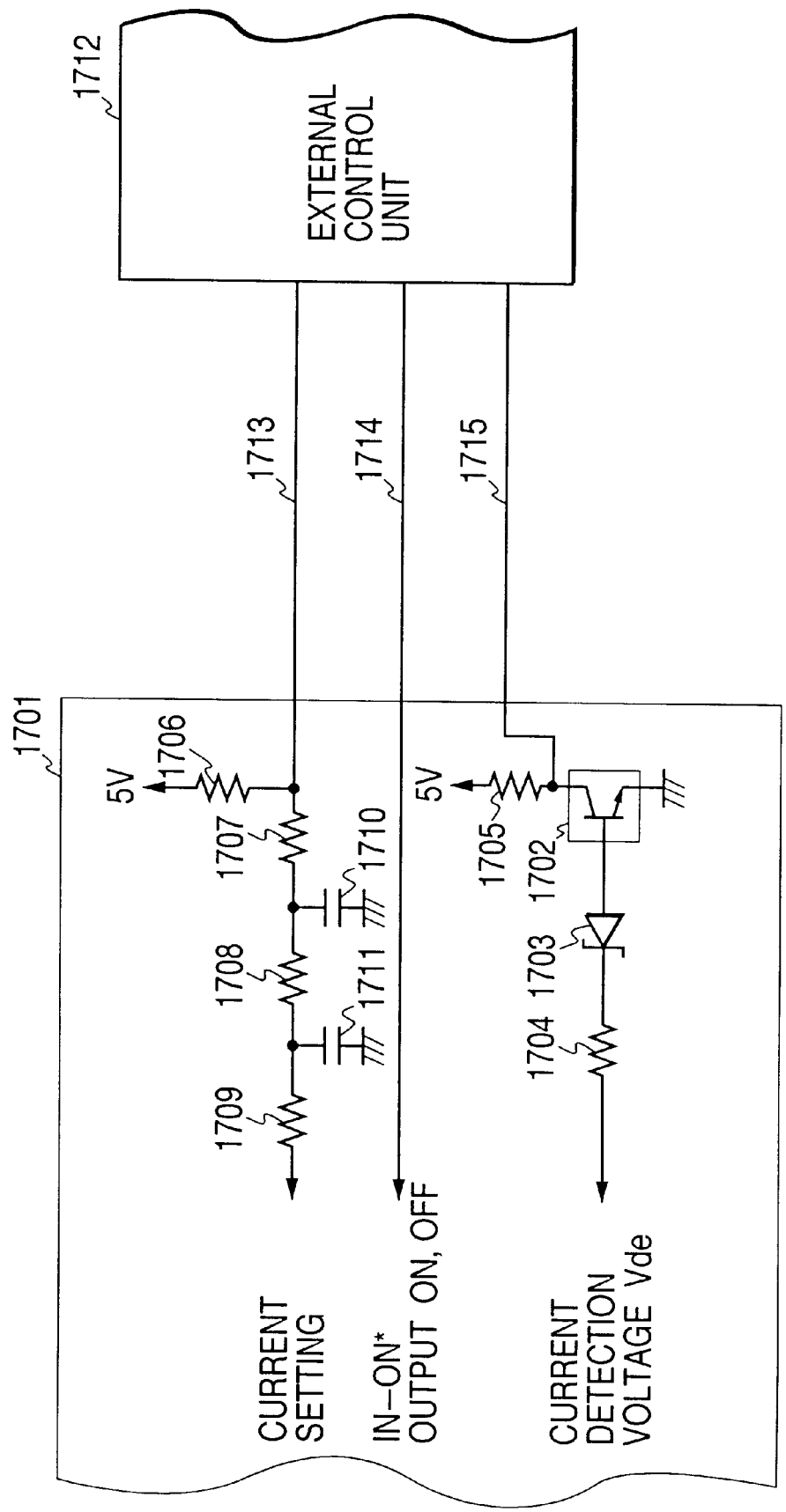
FIG. 17 shows a block diagram of a configuration of a power circuit in accordance with a ninth embodiment of the present invention.

A ninth embodiment of the present invention is now explained with reference to FIG. 17. FIG. 17 shows a block diagram of a configuration of the power circuit in accordance with the ninth embodiment of the present invention. In FIG. 17, numeral 1701 denotes a power circuit which comprises a transistor 1702, a zener diode 1703, resistors 1704, 1705, 1706, 1707, 1708 and 1709 and capacitors 1710 and 1711. A current set PWM (pulse width modulation) signal 1703 from the external control unit 1712 and the external on signal (EX-ON*) 1714 are inputted to the power circuit 1701. Further, a current on/off detection signal 1715 is inputted from the power circuit 1701.

The power circuit 1701 in accordance with the present embodiment is effective when the power controller as described in the eighth embodiment is not provided in the power circuit 1701.

An operation of the power circuit 1701 in accordance with the present embodiment is now explained.

First, the load current set information is conveyed to the power controller from the external control unit 1712. In the present embodiment, a PWM (pulse width modulation) signal having predetermined frequency and duty is outputted to the power circuit 1701 from the output port of the external control unit 1712 and it is filtered by a low pass filter to produce an analog voltage. Then, the EX-ON*=L which indicates the turn-on of the output operation is outputted. In this manner, the power circuit raises the output voltage to maintain the load current at the predetermined value.

Thereafter, after the elapse of the predetermined time by the time management in the external control unit 1712, the output from the load current detection means is required to determine whether the load current is not lower than the predetermined value ID or not.

When Id<ID, the EX-ON* is rendered to H to temporarily interrupt the high voltage output operation. Thereafter, the EX-ON*=L signal is issued in the same procedure as required, and after the elapse of the predetermined time, a sequence to check the load current is repeated. If required, a maximum number of times of repetition is set and when the load current does not exhibit the predetermined value or higher even after the issuance of the output-on signal by the maximum number of times, the sequence control of the external control unit 1712 may shift to an error process by taking it as a high voltage load failure. When Id>ID, the output interrupt procedure is skipped.

In accordance with the power circuit 1701 of the present embodiment, the output operation may be made intermittent or forcibly terminated by utilizing the sequence control means for only the determination result of the load current value in order to shift to the error sequence of the system even when the power controller such as the microcomputer is not provided in the power circuit 1701 and a high degree of protection process is attained.

The present invention is not limited to the embodiments described above but various modifications thereof may be made within the scope of the claims.

What is claimed is:

1. A power circuit comprising:
   a transformer having a flyback winding for outputting energy at an off-time of a primary winding to a secondary circuit, a forward winding for outputting energy at an on-time of the prime winding and a high voltage winding for outputting energy over an entire period;
   a first power supply circuit for rectifying the output of said flyback winding and supplying power to a load;
   a second power supply circuit for rectifying the output of said forward winding and supplying power to a load;
   a voltage detection means for detecting the output voltage of said first power supply circuit;
   first control means for controlling the on-time of said transformer in accordance with the output of said voltage detection means to control the output voltage of said first power supply circuit to a first predetermined value; and
   second control means for causing said second power supply circuit to start an operation when the output of said first power supply circuit exceeds a second predetermined value lower than the first predetermined value.

2. A power circuit comprising:
   a transformer;
   a current detection circuit for detecting a current flowing through a load connected to a secondary side of said transformer;
   a control circuit for comparing the current detected by said current detection circuit with a target value, and controlling an input voltage to a primary side of said transformer according to a compared result;
   a voltage detection circuit for detecting an output voltage of the secondary side of said transformer; and
   a drive control circuit for controlling driving of the primary side of said transformer according to the voltage detected by said voltage detection circuit,
   wherein said control circuit sets the target value to be a value higher than an ordinary value during a predetermined time from driving start of the primary side of said transformer, and sets the target value to be the ordinary value after elapsing the predetermined time.

3. A power circuit comprising:
   a transformer having a flyback winding for outputting energy at an off-time of a primary winding to a secondary circuit, a forward winding for outputting energy at an on-time of the prime winding and a high voltage winding for outputting energy over an entire period;
   a first power supply circuit for rectifying the output of said flyback winding and supplying power to a load;
   a second power supply circuit for rectifying the output of said forward winding and supplying power to a load;
   a voltage detection means for detecting the output voltage of said first power supply circuit;
   first control means for controlling the on-time of said transformer in accordance with the output of said voltage detection means to control the output voltage of said first power supply circuit to a first predetermined value; and
   a restriction circuit for restricting a conduction angle of said second power supply circuit to be a value equal to or smaller than a third predetermined value, in a case where the output of said first power supply circuit is equal to or lower than a second predetermined value lower than the first predetermined value.

4. A circuit according to claim 3, further comprising:
   a comparison circuit for comparing an output of said second power supply circuit with a fourth predetermined value; and
   a generation circuit for generating a control signal to control driving of said second power supply circuit on the basis of an output of said comparison circuit,
   wherein said restriction circuit changes the output of said comparison circuit.

5. A circuit according to claim 4, wherein said generation circuit has a triangular wave generation circuit to generate the control signal by slicing a triangular wave generated from said triangular wave generation circuit at a slice level according to the output of said comparison circuit, and said restriction circuit changes the slice level.

6. A power circuit comprising:
   a transformer having a flyback winding for outputting energy at an off-time of a primary winding to a secondary circuit, a forward winding for outputting energy at an on-time of the prime winding and a high voltage winding for outputting energy over an entire period;
   a first power supply circuit for rectifying the output of said flyback winding and supplying power to a load;

a second power supply circuit for rectifying the output of said forward winding and supplying power to a load;

a voltage detection means for detecting the output voltage of said first power supply circuit;

first control means for controlling the on-time of said transformer in accordance with the output of said voltage detection means to control the output voltage of said first power supply circuit to a first predetermined value; and a restriction circuit for restricting a conduction angle of said second power supply circuit to be a value equal to or smaller than a third predetermined value, in a case where an output of said second power supply circuit is equal to or lower than a second predetermined value lower than the first predetermined value.

7. A circuit according to claim 6, further comprising:

a comparison circuit for comparing the output of said second power supply circuit with a fourth predetermined value; and a generation circuit for generating a control signal to control driving of said second power supply circuit on the basis of an output of said comparison circuit, wherein said restriction circuit changes the output of said comparison circuit.

8. A circuit according to claim 7, wherein said generation circuit has a triangular wave generation circuit to generate the control signal by slicing a triangular wave generated from said triangular wave generation circuit at a slice level according to the output of said comparison circuit, and said restriction circuit changes the slice level.

9. A power circuit comprising:

a transformer having a flyback winding for outputting energy at an off-time of a primary winding to a secondary circuit, a forward winding for outputting energy at an on-time of the prime winding and a high voltage winding for outputting energy over an entire period;

a first power supply circuit for rectifying the output of said flyback winding and supplying power to a load;

a second power supply circuit for rectifying the output of said forward winding and supplying power to a load;

a voltage detection means for detecting the output voltage of said first power supply circuit;

first control means for controlling the on-time of said transformer in accordance with the output of said voltage detection means to control the output voltage of said first power supply circuit to a first predetermined value; and a restriction circuit for restricting a conduction angle of said second power supply circuit, wherein said first control means outputs a signal to suppress an operation of said restriction circuit for a predetermined time when the output of said first power supply circuit reaches a second predetermined value.

10. A circuit according to claim 9, further comprising:

a comparison circuit for comparing the output of said second power supply circuit with a fourth predetermined value; and a generation circuit for generating a control signal to control driving of said second power supply circuit on the basis of an output of said comparison circuit, wherein said restriction circuit changes the output of said comparison circuit.

11. A circuit according to claim 10, wherein said generation circuit has a triangular wave generation circuit to generate the control signal by slicing a triangular wave generated from said triangular wave generation circuit at a slice level according to the output of said comparison circuit, and said restriction circuit changes the slice level.

12. A power circuit comprising:

a transformer;

a current detection circuit for detecting a current flowing through a load connected to a secondary side of said transformer;

a constant current control circuit for comparing the current detected by said current detection circuit with a target value, and controlling an input voltage to a primary side of said transformer according to a compared result;

a voltage detection circuit for detecting an output voltage of the secondary side of said transformer;

a constant voltage control circuit for controlling the input voltage to the primary side of said transformer such that the voltage detected by said voltage detection circuit reaches a target voltage; and control means for causing said constant voltage control circuit to operate until the voltage detected by said voltage detection circuit reaches the target voltage, and for causing said constant voltage control circuit to be inoperable and causing said constant current control circuit to operate when the voltage detected by said voltage detection circuit reaches the target voltage.

* * * * *

UNITED STATES PATENT AND TRADEMARK OFFICE
CERTIFICATE OF CORRECTION

PATENT NO.   : 5,963,437
DATED        : October 5, 1999
INVENTOR(S)  : Toshiyuki Sekiya It is certified that error appears in the above-identified patent and that said Letters Patent is hereby corrected as shown below:

Title page,
Item [56], References Cited, U.S. PATENT DOCUMENTS, "5,297,104" should read -- 5,297,014 --.
Attorney, Agent, or Firm, "Fitzpatrick Cella Harper & Scinto" should read -- Fitzpatrick, Cella, Harper & Scinto --.

Column 1,
Line 10, "activate" should read -- activates --.

Column 2,
Line 62, "is" should read -- are --.

Column 3,
Line 7, "hundreds voltages to several tens" should read -- hundreds of volts to several tens of --;
Line 13, "signals" should read -- signal --;
Line 18, "been" should be deleted;
Line 20, "by the" should read -- caused by a --; and
Line 52, "tens" should read -- tens of --.

Column 4,
Line 49, "R"" should read -- R2 --.

Column 5,
Line 41, "tens" should read -- tens of --.

Column 6,
Line 1, "referred" should read -- referred to --; and
Line 10, "a" should be deleted.

Column 8,
Line 24, "shorts" should read -- short --.

Column 9,
Line 1, "or" should read -- cr --.

Column 13,
Line 1, "to" should be deleted; and
Line 46, "limit" should read -- limited to be --.

UNITED STATES PATENT AND TRADEMARK OFFICE
CERTIFICATE OF CORRECTION

PATENT NO. : 5,963,437
DATED : October 5, 1999
INVENTOR(S) : Toshiyuki Sekiya

It is certified that error appears in the above-identified patent and that said Letters Patent is hereby corrected as shown below:

Column 15,
Line 13, "generate" should read -- generates --.

Column 16,
Line 24, "render" should read -- renders --; and
Line 45, "embodiment," should read -- embodiment is performed by --.

Signed and Sealed this

Twenty-seventh Day of November, 2001

Attest:

*Nicholas P. Godici*

NICHOLAS P. GODICI
*Attesting Officer*     *Acting Director of the United States Patent and Trademark Office*